(12) United States Patent
Dong et al.

(10) Patent No.: US 8,213,077 B2
(45) Date of Patent: Jul. 3, 2012

(54) MULTI-CLAD OPTICAL FIBERS

(75) Inventors: Liang Dong, Ann Arbor, MI (US); Hugh McKay, Ann Arbor, MI (US)

(73) Assignee: IMRA America, Inc., Ann Arbor, MI (US)

( * ) Notice: Subject to any disclaimer, the term of this patent is extended or adjusted under 35 U.S.C. 154(b) by 496 days.

(21) Appl. No.: 12/412,225

(22) Filed: Mar. 26, 2009

(65) Prior Publication Data
US 2010/0079855 A1 Apr. 1, 2010

Related U.S. Application Data

(60) Provisional application No. 61/047,079, filed on Apr. 22, 2008.

(51) Int. Cl.
*H04B 10/17* (2006.01)
*G02B 6/036* (2006.01)
(52) U.S. Cl. ............... 359/341.1; 385/126; 385/127
(58) Field of Classification Search ............... 359/341.1; 385/126, 127
See application file for complete search history.

(56) References Cited

U.S. PATENT DOCUMENTS

| 4,641,917 A | 2/1987 | Glodis et al. |
| 4,815,079 A | 3/1989 | Snitzer |
| 4,877,300 A * | 10/1989 | Newhouse et al. ............. 385/43 |
| 5,032,001 A | 7/1991 | Shang |
| 5,175,785 A | 12/1992 | Dabby |
| 5,353,363 A | 10/1994 | Keck |
| 5,452,394 A | 9/1995 | Huang |
| 5,533,163 A | 7/1996 | Muendel |
| 5,615,673 A | 4/1997 | Berger |
| 5,818,630 A | 10/1998 | Fermann |
| 5,949,941 A * | 9/1999 | DiGiovanni ................... 385/127 |
| 5,966,491 A * | 10/1999 | DiGiovanni ................... 385/127 |

(Continued)

FOREIGN PATENT DOCUMENTS
WO WO 2009/042347 4/2009

OTHER PUBLICATIONS

Proulx, "Improving the mode profile circularity of microstructured optical fibers by using an Archimedean-like cladding structure", Proceedings of SPIE, 7099, 70990Q(8), (2008).*

(Continued)

*Primary Examiner* — Eric Bolda
(74) *Attorney, Agent, or Firm* — Knobbe, Martens, Olson & Bear, LLP

(57) ABSTRACT

Multi-clad optical fibers and fiber amplifiers are disclosed. Various embodiments include multi-clad, large core fiber amplifiers. In various implementations mixing of pump modes is enhanced relative to that obtainable with conventional double-clad fibers. In some embodiments end terminations are provided with increased length of end-cap fiber. In at least one embodiment a multi-clad fiber is provided, with a pump cladding formed by stacking a layer of low index rods in the preform. Various embodiments include a multi-clad fiber amplifier system. The system includes a pump source to pump said fiber amplifier. The system also includes an optical fiber having a core and a cladding, wherein the cladding includes a pump cladding having a corrugated boundary. In various embodiments the pump cladding is formed by rods in a preform, which are disposed to mix the pump modes and/or scatter or reflect pump energy into the core.

22 Claims, 18 Drawing Sheets

U.S. PATENT DOCUMENTS

| | | | |
|---|---|---|---|
| 6,072,811 A | 6/2000 | Fermann | |
| 6,157,763 A | 12/2000 | Grubb | |
| 6,334,019 B1 | 12/2001 | Birks | |
| 6,411,762 B1 * | 6/2002 | Anthon et al. | 385/123 |
| 6,444,133 B1 | 9/2002 | Fajardo | |
| 6,480,659 B1 * | 11/2002 | Patlakh et al. | 385/125 |
| 6,795,635 B1 | 9/2004 | Fajardo | |
| 6,954,575 B2 | 10/2005 | Fermann | |
| 6,987,783 B2 | 1/2006 | Fajardo | |
| 7,116,875 B2 * | 10/2006 | Wadsworth et al. | 385/123 |
| 7,289,709 B2 * | 10/2007 | Folkenberg et al. | 385/126 |
| 7,450,813 B2 | 11/2008 | Dong | |
| 2003/0012534 A1 * | 1/2003 | Sumida et al. | 385/123 |
| 2004/0033043 A1 | 2/2004 | Monro | |
| 2004/0071423 A1 | 4/2004 | Libori | |
| 2005/0008051 A1 * | 1/2005 | Sumida | 372/39 |
| 2005/0069269 A1 | 3/2005 | Libori | |
| 2006/0193583 A1 | 8/2006 | Dong | |
| 2007/0041083 A1 * | 2/2007 | Di Teodoro et al. | 359/333 |
| 2007/0266738 A1 * | 11/2007 | Gallagher et al. | 65/393 |
| 2008/0069508 A1 | 3/2008 | Dong | |
| 2010/0157418 A1 | 6/2010 | Dong et al. | |

OTHER PUBLICATIONS

Dong, L., et al., "Robust Single-mode Operation in 50μm Ytterbium-doped Leakage Channel Fibers," in Fiber Lasers IV: Technology, Systems, and Applications, eds. Harter et al, Proc. SPIE, vol. 6453, pp. 645316-1 to 645316-8, Feb. 2007.

Wu, T., et al., "Bend performance of leakage channel fibers," Optics Express, vol. 16, No. 6, pp. 4278-4285, Mar. 17, 2008.

Dong, L., et al., "All-Glass Large-Core Leakage Channel Fibers," IEEE J. Selected Topics Quantum Electronics, vol. 15, No. 1, pp. 47-53, Feb. 2009.

Fu, L., et al., "All-glass Leakage Channel Fibers with Fluorine-doped Silica Pump Cladding," Optical Society America, CLEO Symposium on High-Power Solid-State Lasers, paper CThR4, pp. 1-2, May 2009.

* cited by examiner

MULTI-CLAD OPTICAL FIBERS

CROSS-REFERENCE TO RELATED APPLICATIONS

This application claims the benefit under 35 U.S.C. §119 (e) of U.S. Provisional Patent Application No. 61/047,079, filed Apr. 22, 2008, entitled "MULTI-CLAD OPTICAL FIBERS," the disclosure of which is hereby incorporated by reference herein in its entirety. This application is related to U.S. Provisional Patent Application No. 60/975,478, filed Sep. 26, 2007, entitled "GLASS LARGE-CORE OPTICAL FIBERS" (the '478 Application). The entire disclosure of the '478 Application is hereby incorporated by reference herein. This application is also related to PCT international application no. PCT/US2008/074668, filed Aug. 28, 2008, entitled "GLASS LARGE-CORE OPTICAL FIBERS" (the '668 Application). The entire disclosure of the '668 Application is hereby incorporated by reference herein.

BACKGROUND

1. Field

The present disclosure relates generally to optical fibers and more particularly to multi-clad optical fibers.

2. Description of the Related Art

Optical fiber laser markets have grown significantly in the past few years. Further increase of peak powers will enable a wider range of applications, especially in micro-processing and material processing. However, nonlinear effects limit achievable peak power. A possible key to further peak power increase is a fiber which supports single mode (SM) operation with very large effective area. In previous patents owned by the assignee of the present application, leakage channel fibers (LCFs) were disclosed which can potentially extend effective area by well over an order of magnitude compared to conventional large mode area approaches. Consequently, well over an order of magnitude increase in peak powers from fiber lasers is expected from this new technology.

Many leakage channel fiber designs use low refractive index coating to form a pump guide. This low refractive index coating is sufficient at low pump power levels and can get damaged at high pump powers due to absorption and thermally-induced degradation. With low refractive index coating, a glass part of the fiber is the pump guide. It is preferred in many cases to be able to design the pump guide independent of the fiber dimension. For example, one possible situation is where a large fiber dimension is preferred for resistance to external perturbations such as micro and macro bends, while, a small pump guide is preferred for high pump absorption.

Furthermore, many double clad conventional fibers have used low refractive index polymer to form the pump guide. An annulus region of low refractive index glass has also been used to form the pump guide. Embodiments of such "all-glass" designs may provide an improvement over the designs with low refractive index polymer as these designs may be more resistant to pump induced optical damage. Such designs may not, however, offer sufficient pump mode mixing, which can lead to low pump absorption due to the existence of skew rays.

In some fiber configurations, end caps with no guiding cores have been spliced to fibers to allow mode expansion before the mode reaches the end face of the fiber. This leads to low optical intensity on the end face to minimize surface damage. In the double clad fibers with large cores, a long end cap is required as a consequence of the small diffraction of the large mode. In a counter-directionally pumped amplifier, this long end cap makes coupling pump to the pump guide through the end cap very difficult.

SUMMARY

In at least one embodiment, a multi-clad fiber is provided. For example, the fiber may comprise an outer cladding that substantially surrounds a pump cladding that substantially surrounds a second cladding that substantially surrounds a first cladding having first cladding features. The first cladding may substantially surround a core. In some embodiments, some or all of the first cladding features may comprise stress rods for providing a polarization-maintaining fiber. In some embodiments, the outer cladding comprises a non-circular boundary, which may be polygonal (e.g., hexagonal). In some embodiments, the pump cladding comprises a corrugated inner boundary, which may provide pump mode mixing and/or increased pump absorption by coupling skew rays into rays intersecting the core of the fiber. In some embodiments, some or all of the fiber may be doped. In some embodiments, the pump cladding is formed by stacking a layer of low index rods in a preform. In some embodiments mixing of pump modes is enhanced relative to mixing obtainable with conventional double-clad fibers.

At least one embodiment provides an assembly where a fiber with only a pump guide is spliced to a large core amplifier fiber for expanding the beam size before it reaches the end face of the fiber and injection of pump power. In some embodiments end terminations are provided with increased length of end-cap fiber.

Various embodiments include a multi-clad fiber amplifier system. The system comprises a pump source to pump said fiber amplifier. The system also comprises an optical fiber having a core and a pump cladding, wherein the cladding includes a pump cladding comprising a pump cladding inner boundary having frequent and distinct changes in slope along said boundary. The pump cladding may be formed by rods in a preform, which are disposed to mix the pump modes and scatter or reflect pump energy into the core. Various embodiments include multi-clad, large core fiber amplifiers.

An embodiment of a multi-clad fiber amplifier system is disclosed herein. The amplifier system comprises an optical fiber having a core and a pump cladding. The pump cladding comprises a continuous pump cladding inner boundary. The pump cladding inner boundary comprises a corrugated inner boundary comprising a plurality of linear or curved segments forming at least twelve inner cladding portions along said inner cladding boundary. The system also comprises a pump source configured to pump the optical fiber. The pump cladding is configured to mix pump modes and/or scatter or reflect pump energy from the pump source into the core of the optical fiber. In some embodiments, the corrugated inner boundary comprises a plurality of linear or curved segments along said inner cladding boundary that form at least twelve crests that alternate with at least twelve troughs An embodiment of a preform for an optical fiber is disclosed. The preform comprises an inner region comprising one or more layers of rods formed from a background material. The preform also comprises one or more layers of pump cladding rods that substantially surround the inner region. The pump cladding rods can be formed from a material with a refractive index lower than the refractive index of the background material. A fiber can be drawn from embodiments of the preform.

An embodiment of a multi-clad fiber comprises an outer cladding that substantially surrounds a pump cladding that substantially surrounds a second cladding that substantially surrounds a first cladding having first cladding features. The first cladding substantially surrounds a core, and the pump cladding has a corrugated inner boundary comprising a plurality of linear or curved segments. In some embodiments, the corrugated inner boundary comprises a plurality of alternating crests and troughs.

BRIEF DESCRIPTION OF THE DRAWINGS

FIG. 9B shows a close-up view of the central portion of the fiber shown in FIG. 9A.

DETAILED DESCRIPTION OF PREFERRED EMBODIMENTS

Various embodiments described herein include single mode fiber and large core fiber. In some embodiments, the fiber may operate over a large wavelength range. Various embodiments are also described that comprise a fiber including cladding features comprising material (e.g., fluorine doped silica glass) that may produce a very low relative refractive index difference with respect to the cladding material in which the cladding features are disposed. This relative refractive index difference may be characterized by $(n_1-n_2)/n_1$, where $n_1$ is the index of refraction of the cladding material in which the cladding features are included, and $n_2$ is the index of refraction of the cladding features.

Figure 1:
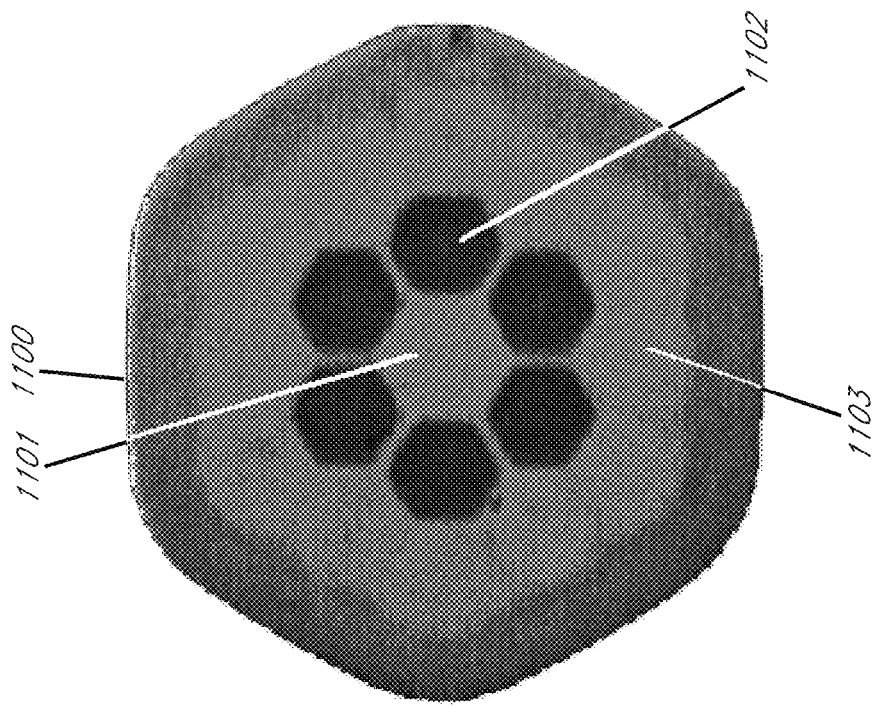
FIG. 1 schematically illustrates an embodiment of a preform for an embodiment of a leakage channel fiber and includes a photograph of an example cross section of an embodiment of a leakage channel fiber drawn from the preform.
Figure 1:
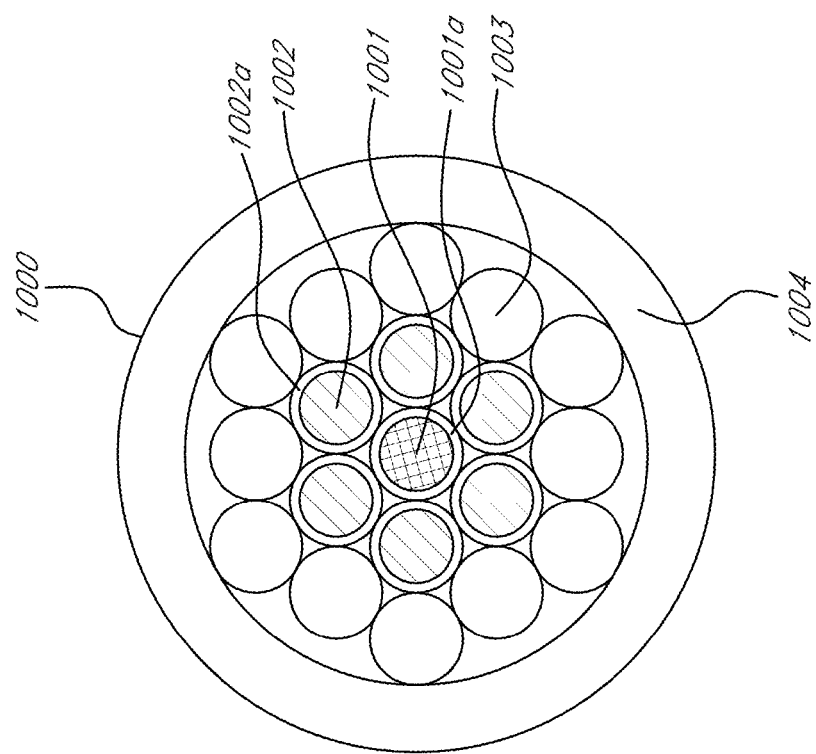

FIG. 1 illustrates an example of a design of a leakage channel fiber 1100. In some embodiments, the leakage channel fiber can be configured to provide higher leakage loss for higher order propagation modes than for lower order propagation modes. Some such embodiments may provide single-mode behavior, because higher order modes have much higher propagation losses than the fundamental mode. An embodiment of a preform 1000 can be used to draw the LCF 1100. The preform 1000 comprises a central core rod 1001 which may contain a rare earth doped portion (e.g., in its center). The refractive index of the rare earth doped glass may be closely matched to that of the background glass. The rare earth doped portion may include all of the core rod 1001, in some embodiments. In other embodiments, the rare earth doped portion may comprise a portion of core rod 1001 surrounded by background glass 1001a. In other embodiments, dopants other than rare earth elements may be used. In the illustrated example, the core rod 1001 is surrounded by six 1st cladding rods 1002 comprising a low index portion in the center surrounded by background glass 1002a. In some embodiments, one or more of the 1st cladding rods 1002 may comprise capillaries made of the background glass with rods inserted into them made of a glass of slightly lower refractive index than that of the background glass. For example, in the case where the background glass is fused silica, this lower refractive index glass can be fluorine and/or boron doped silica. In some embodiments, a glass rod is not inserted into the capillary, which may provide an air feature in the fiber drawn from the preform. In the embodiment illustrated in FIG. 1, the six 1st cladding rods 1002 are further surrounded by rods 1003 made of the background glass. A tube 1004 made of the background glass encloses all the rods 1001, 1002, and 1003. An LCF 1100 can be drawn from the preform 1000. The LCF 1100 comprises a core 1101, 1st cladding features 1102, and 2nd cladding 1103. In at least one embodiment where background glass is synthetic silica, one or more of the 1st cladding features 1102 can be made of fluorine-doped silica and/or the 2nd cladding 1103 can be made of synthetic fused silica.

Figure 2:
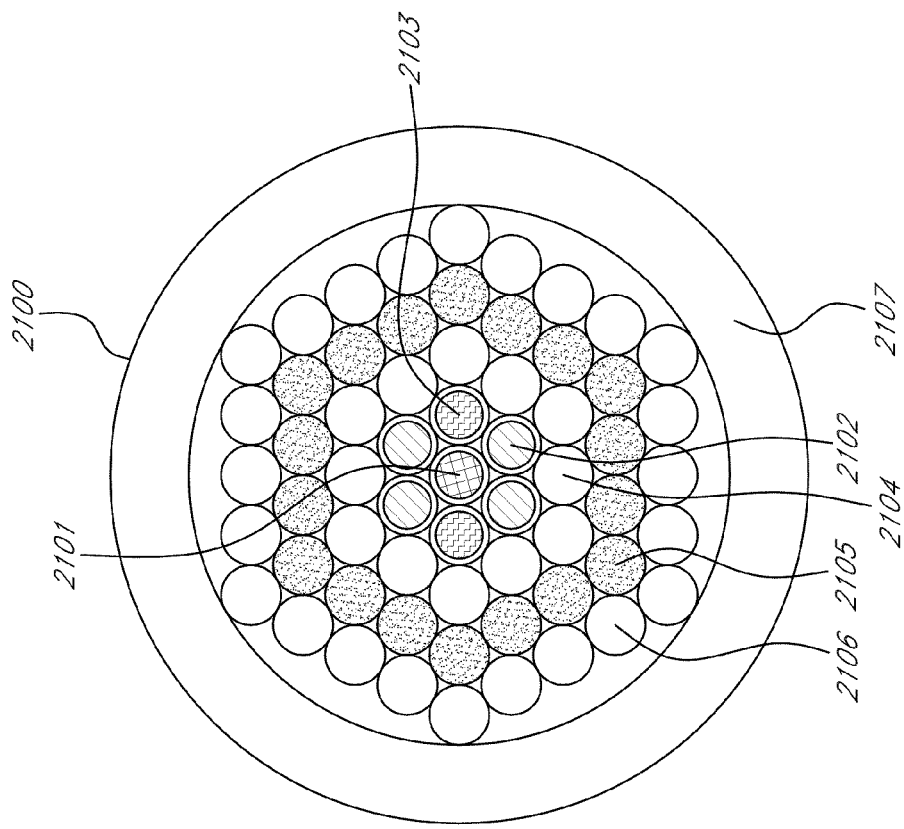
FIG. 2 schematically illustrates examples of multi-clad fiber preform designs where a pump guide is formed by a layer of low index glass. In various embodiments, fibers drawn from the example preforms include a small pump guide for high pump absorption and a large fiber dimension for stability against mechanical perturbations. Examples of a polarization-maintaining (PM) design (on the right) and a non-PM design (on the left) are shown.
Figure 2:
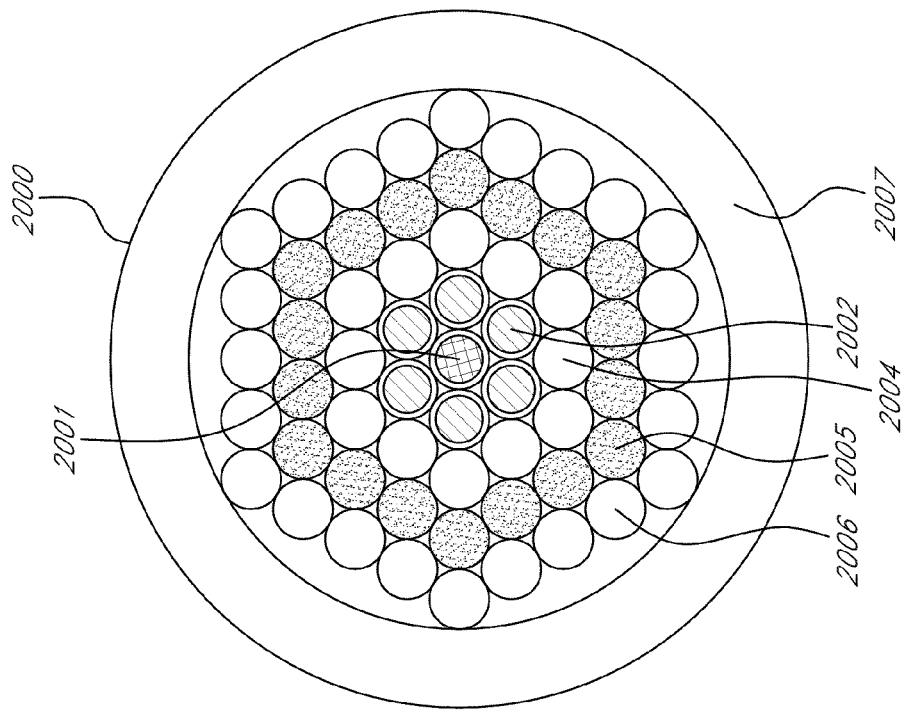

FIG. 2 schematically illustrates two examples of designs for all glass multiple cladding LCF preforms. In a first illustrated example, an embodiment of a preform 2000 comprises a core rod 2001, 1st cladding rods 2002, which are further surrounded by background rods 2004. Surrounding the background rods 2004 are a layer of pump cladding rods 2005. In various embodiments, the pump cladding rods 2005 may have much lower refractive index than that of the background rods 2004. The pump cladding rods 2005 are surrounded by background rods 2006. A rod stack comprising rods 2001, 2002, 2004, 2005, and 2006 is inserted into a tube 2007, which may be made of background glass in some embodiments. In certain embodiments, the 1st cladding rods are made similarly as described above with reference to FIG. 1. In at least one embodiment where the background glass is fused silica, the pump cladding rods 2005 can be made of fused silica doped with a sufficient amount of fluorine to provide a pump numerical aperture (NA) greater than about 0.15. In other embodiments, doping with fluorine (or other suitable dopants such as, e.g., boron) may be used to provide a pump NA greater than about 0.05, greater than about 0.10, greater than about 0.15, greater than about 0.20, or some other suitable NA. The pump cladding rods 2005 form the pump guide of a fiber drawn from the preform 2000. An advantage of certain such fiber embodiments is that the pump guide can be configured independently of fiber size. In an alternative embodiment, rods 2006 and tube 2007 may also be made of similar material as pump cladding rods 2005. In another alternative embodiment, tube 2007 is omitted.

FIG. 2 also schematically illustrates an alternative embodiment of an LCF preform 2100 in which two of the 1st cladding rods 2102 are replaced by two stress rods 2103. The LCF preform 2100 also comprises a core rod 2101, background rods 2104, pump cladding rods 2105, background rods 2106, and a tube 2107, which in some embodiments may be generally similar to the corresponding elements of the LCF preform 2000. In the example shown in FIG. 2, the two stress rods 2103 are disposed diametrically opposite the core rod 2101. In other embodiments, one, three, four, or more of the 1st cladding rods 2102 may be replaced with stress rods. An advantage of an LCF drawn from the preform 2100 is that the LCF may be polarization maintaining. In some embodiments, one or more of the stress rods 2103 can be made of boron-doped silica, in the case where the background glass is fused silica. The number and/or arrangement of the stress rods may be selected to provide, e.g., a desired birefringence of the fiber. In an alternative embodiment, rods 2106 and tube 2107 may also be made of similar material as pump cladding rods 2105. In another alternative embodiment, the tube 2107 is omitted.

An LCF drawn from embodiments of the performs disclosed herein (e.g., the preforms 2000, 2100) may provide other advantages. For example, some LCF embodiments disclosed herein may have a pump cladding with a corrugated inner boundary which may be very beneficial for pump mode mixing and may serve to increase pump absorption by coupling skew rays into rays intersecting the doped core of the fiber.

Figure 2A:
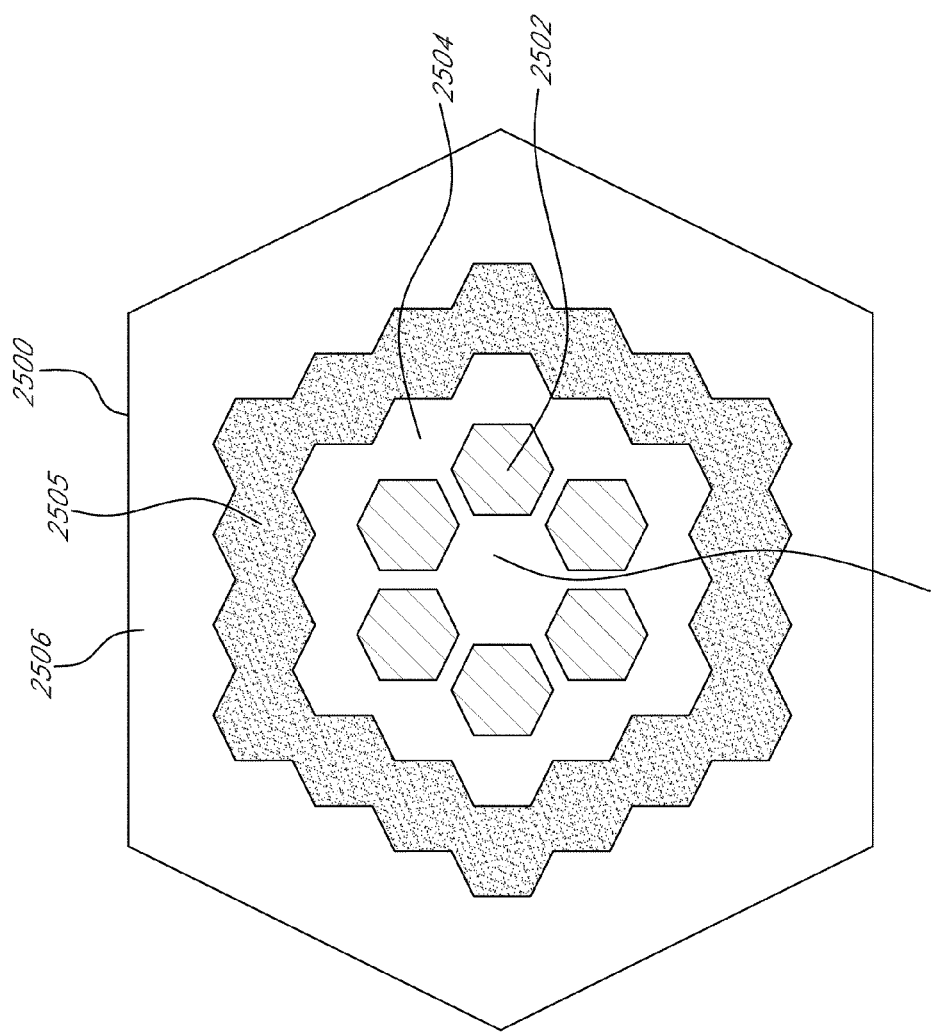
FIGS. 2A and 2B schematically illustrate examples of all glass multi-clad fibers based on, at least in part, the non-PM and PM preforms of FIG. 2, respectively.
Figure 2B:
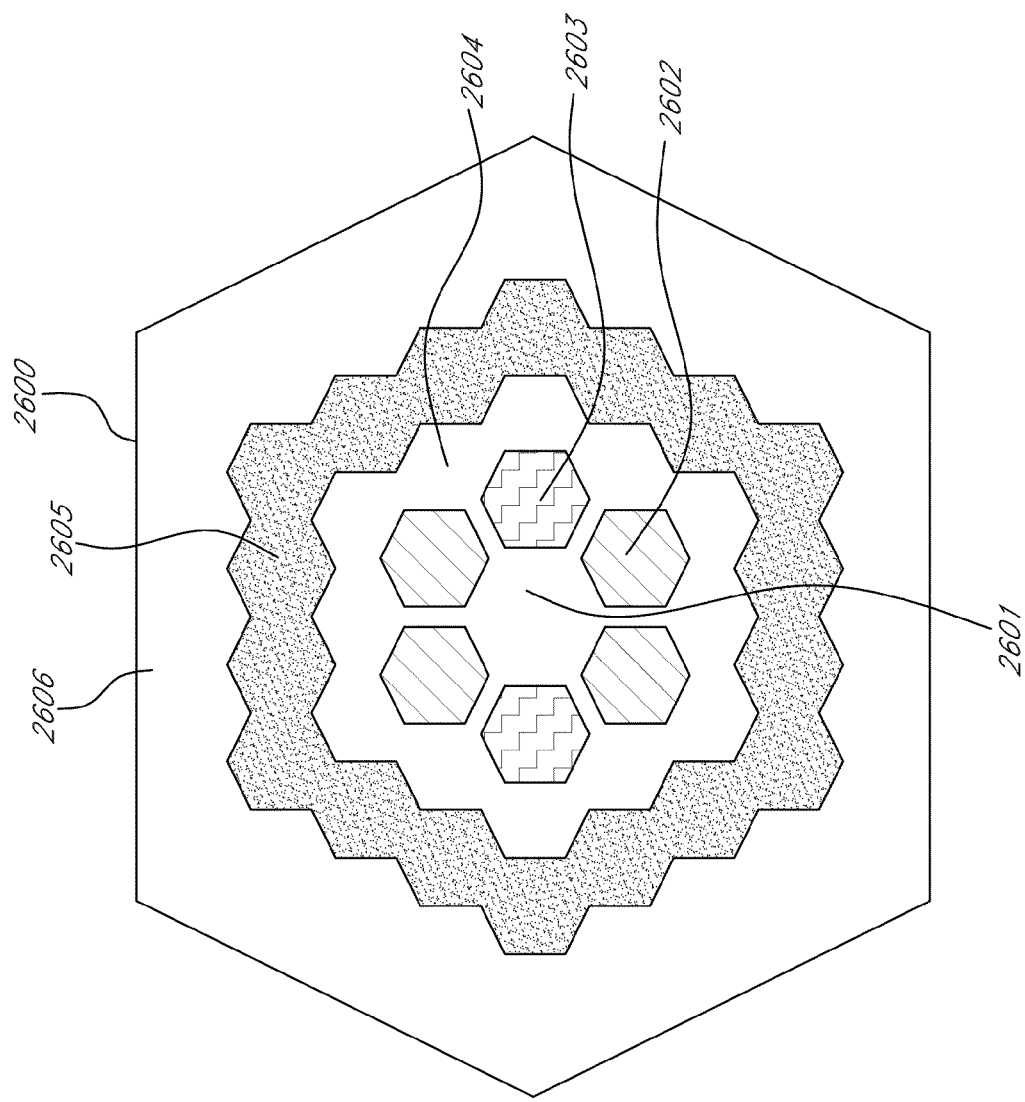

The preform embodiments shown in FIG. 2 are illustrative examples of preforms from which "all-glass" LCFs can be drawn (see, e.g., FIGS. 2A and 2B). In other embodiments, the preform (and LCF drawn therefrom) may comprise one or more rods that are hollow capillaries to provide air holes. In one embodiment, pump rods 2005 or 2105 are replaced by capillaries. A fiber drawn from such an embodiment may comprise an air cladding. Such embodiments may provide a larger refractive index contrast, because, for example, the refractive index of air is about one. Many variations are possible.

FIG. 2A schematically illustrates a multi-clad fiber 2500 based on, at least in part, the preform 2000 described with reference to FIG. 2. The fiber 2500 comprises an outer cladding 2506, a pump cladding 2505, a second cladding 2504, core 2501, and a first cladding having first cladding features 2502. In this example, the outer cladding 2506 substantially surrounds the pump cladding 2505, which substantially surrounds the second cladding 2504, which substantially surrounds the first cladding. The first cladding substantially surrounds the core 2501. In some embodiments, at least a portion of the core 2501 is doped to provide gain. The pump cladding 2505 of the embodiment illustrated in FIG. 2A has an inner boundary (and an outer boundary) having frequent and distinct changes in slope along the inner boundary (and along the outer boundary). The inner boundary of the pump cladding 2505 advantageously may couple pump modes and/or mix pump light into the core in various embodiments. In some embodiments, only one of the inner boundary and the outer boundary have the frequent and distinct slope changes. FIG. 2B illustrates an embodiment of a multi-clad fiber 2600 based on, at least in part, the preform 2100 of FIG. 2. The fiber 2600 comprises an outer cladding 2606, a pump cladding 2605, a second cladding 2604, core 2601, and a first cladding having first cladding features 2602. Embodiments of the example fiber 2600 may be generally similar to that the fiber 2500 of FIG. 2A, except stress rods 2603 are included in the first cladding features 2602 for polarization maintaining operation.

Figure 3:
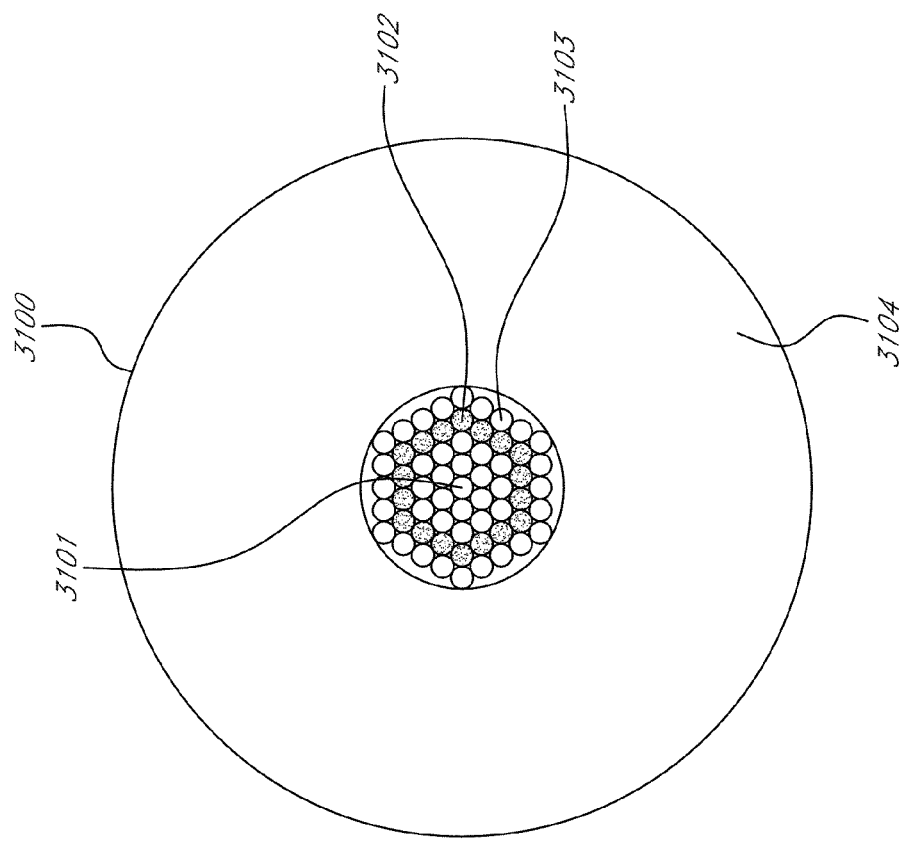
FIG. 3 schematically illustrates examples of designs of fiber preforms. Embodiments of fibers drawn from these example preforms may have a pump guide and no guiding core and may be suitable for output end termination in an amplifier configuration.
Figure 3:
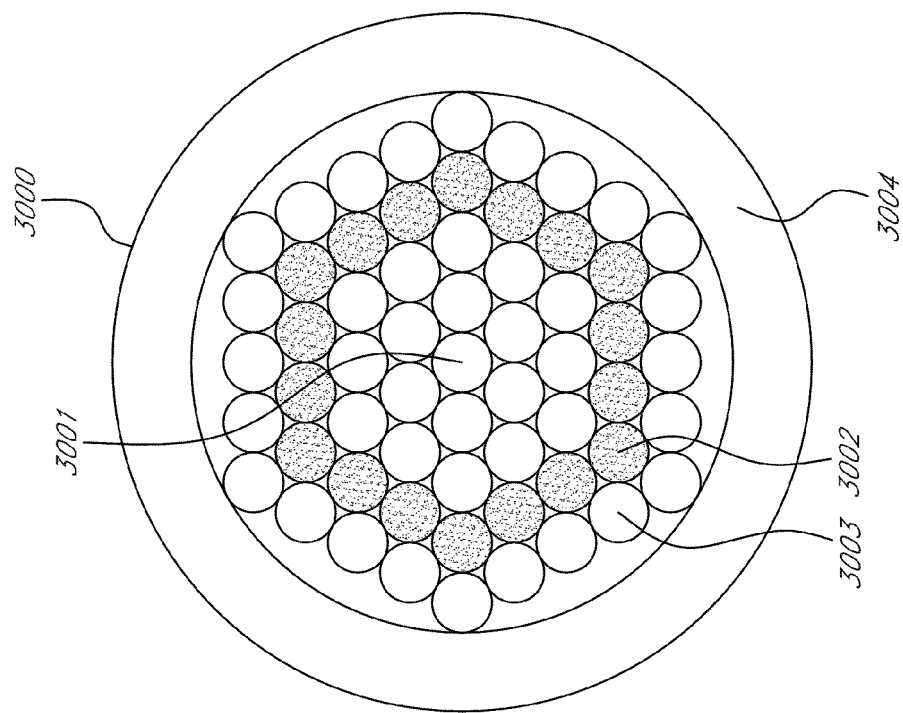

FIG. 3 schematically illustrates an embodiment of a preform 3000 for making a fiber with a pump guide suitable, in some embodiments, for splicing onto an all glass multi-clad LCF for end termination. The example preform 3000 does not include a guiding core. The preform 3000 has a pump core 3001 made of background glass rods surrounded by pump cladding rods 3002. Further background rods 3003 are added to increase the fiber dimension. The stack of rods 3001, 3002, and 3003 is inserted into a tube 3004 made of background glass. An alternative embodiment of a preform 3100 comprises a pump core 3101 made of background glass rods surrounded by pump cladding rods 3102. The alternative embodiment 3100 does not include a guiding core in the illustrated embodiment. Further background rods 3103 are added to increase the fiber dimension. In this alternative embodiment, a much larger tube 3104 is used (compared to the tube 3004) to make a large fiber dimension.

Figure 4:
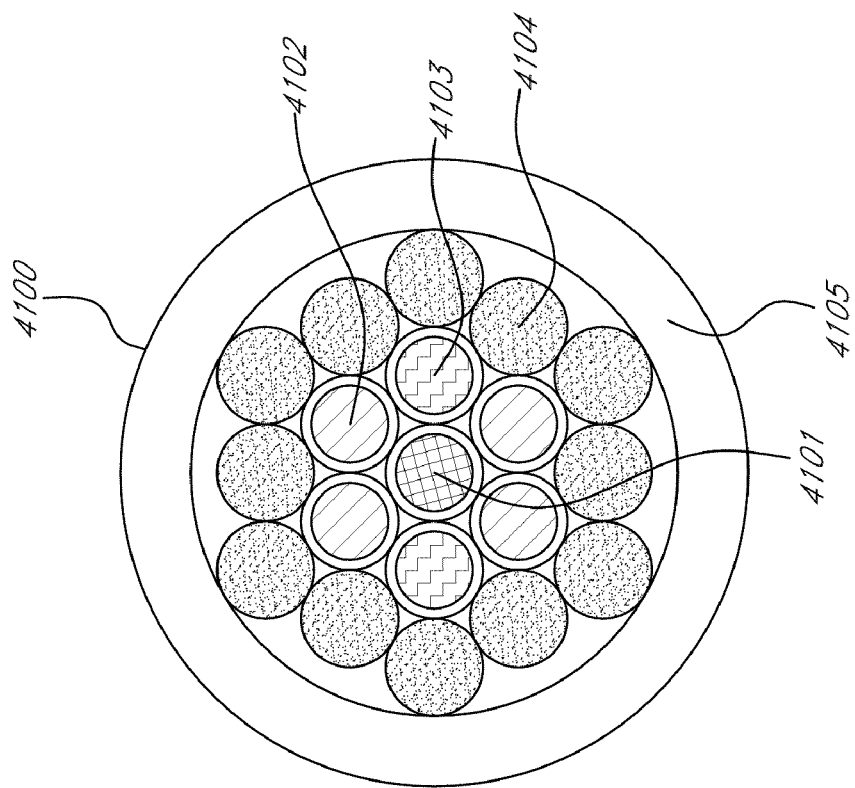
FIG. 4 schematically illustrates examples of alternative designs for various multi-clad fiber preform designs.
Figure 4:
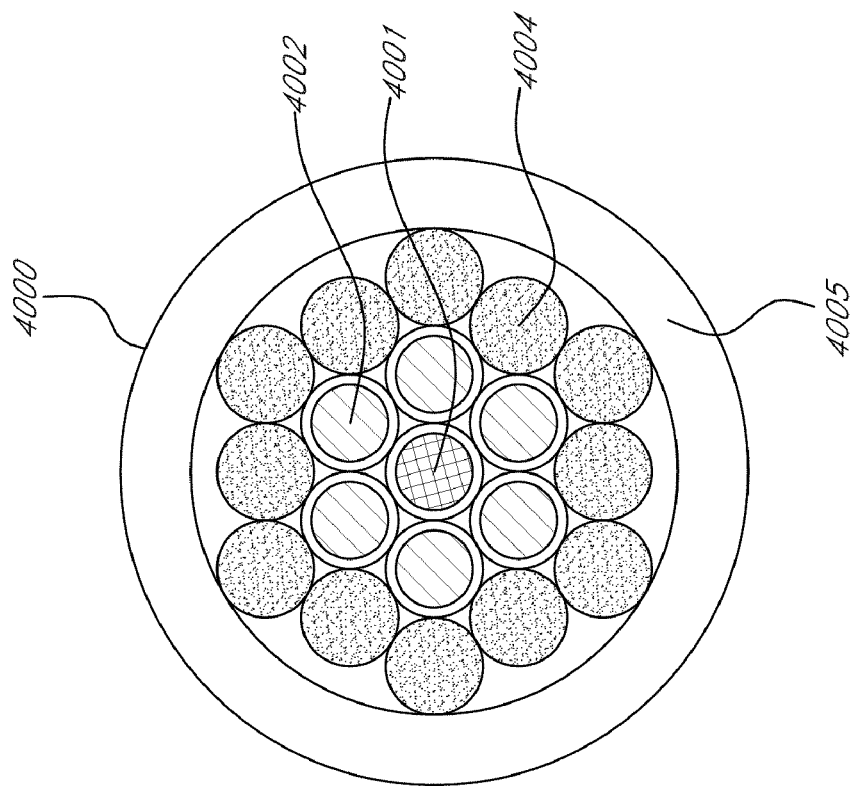

FIG. 4 schematically illustrates an example preform 4000, which is an alternative embodiment of the preform 2000 where the background rods 2004 and 2006 are eliminated. The preform 4000 comprises a core rod 4001, 1st cladding rods 4002, pump cladding rods 4004, and a tube 4005. In various embodiments, the number of layers for rods 2004 and 2006 can be increased or decreased independently of each other for changing the pump guide dimension and/or the overall fiber dimension, respectively, of a fiber drawn from the preform. FIG. 4 further illustrates an example preform 4100, which is an alternative embodiment of the preform 2100 where the background rods 2104 and 2106 are eliminated. The preform 4100 comprises a core rod 4101, 1st cladding rods 4102, stress rods 4103, pump cladding rods 4104, and a tube 4105. Accordingly, the background glass layer between the first cladding and the pump cladding is substantially absent from a fiber drawn from embodiments of the preform 4100. In various embodiments, the number of layers for rods 2104 and 2106 can be increased or decreased independently of each other for changing the pump guide dimension and/or the overall fiber dimension respectively. For example, in various embodiments, the number of layers of any of the background rods 2004, 2006, 2104, and/or 2106 may be none (e.g., as shown in the examples in FIG. 4), one (e.g., as shown in the examples in FIG. 2, or as shown in the outer layer of background rods 3003, 3103 in FIG. 3), two (e.g., as shown in the inner layers of background rods 3001, 3101 in FIG. 3, which surround a central background rod), three, four, five, or more. Many variations are possible.

Figure 5:
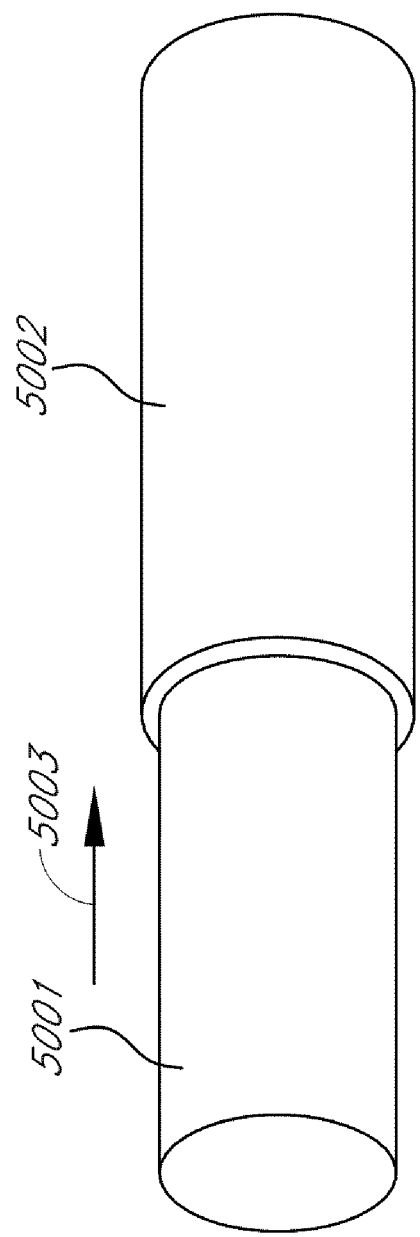
FIG. 5 schematically illustrates an example of making composite capillaries comprising a low refractive index rod and a slightly higher index capillary.

FIG. 5 schematically illustrates an example for making embodiments of cladding rods, pump rods, and/or stress rods. In this example method, a capillary 5002 is made of background glass. A rod 5001 is inserted into the capillary 5002 (in the direction indicated by arrow 5003) to form an assembly. In various embodiments, the assembly can be used, for example, as a 1st cladding rod (e.g., if the rod 5001 comprises glass with a lower refractive index than the capillary 5002) or a stress rod (e.g., if the rod 5001 comprises glass with a different thermal expansion coefficient than the capillary 5002). The assembly may be used with embodiment of the performs described herein.

Figure 6:
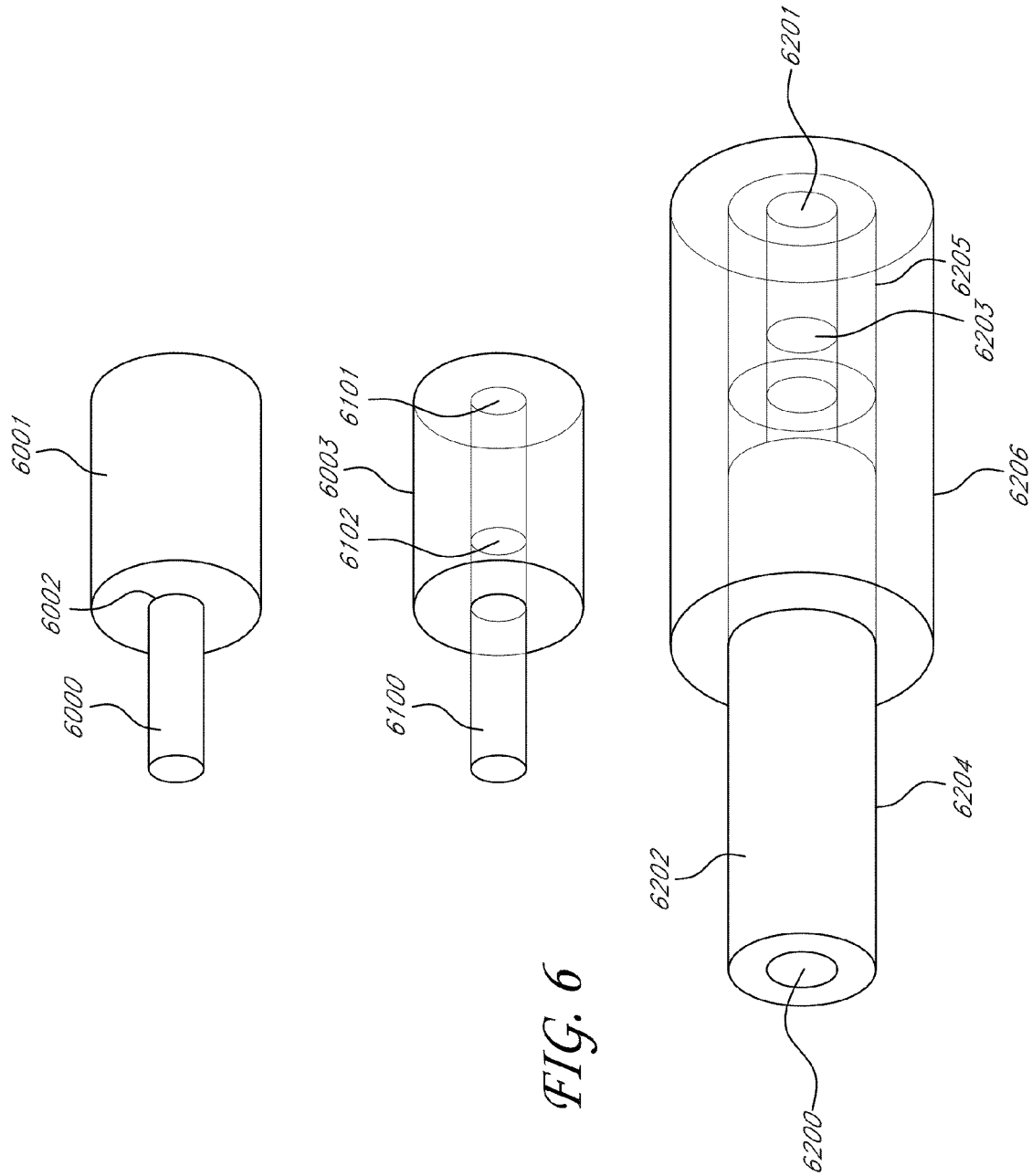
FIG. 6 schematically illustrates various examples of end terminations for fiber amplifiers.

FIG. 6 schematically illustrates examples of end termination at an output end of a fiber laser or amplifier. In one example, an all glass multi-clad LCF 6000 is spliced (at splice 6002) to an end cap fiber 6001 made, for example, from the preform 3100. In some implementations, single mode light leaving the fiber 6000 enters the end cap fiber 6001, and the single mode output expands by diffraction while propagating along the fiber 6001 This expansion reduces optical intensity at the output end of the end cap fiber 6001 to reduce and/or minimize surface damage. In this example, the end cap fiber 6001 has a pump guide matched to that of the fiber 6000. In this example, the end cap fiber 6001 does not include a guiding core but has a pump guide, so that pump light can be coupled into the pump guide of the end cap fiber 6001. The pump light can then be transferred to the pump guide of the fiber 6000. One possible advantage of the incorporation of a pump guide in the end cap fiber 6001 is that it may allow longer length end cap fiber to be used. In some embodiments, the pump guide is particularly beneficial for large mode fibers. In various embodiments, the splice 6002 can be performed by electric arc, resistance heater or other forms of heating. A protective ferrule optionally can be added to protect the splice 6002. Certain embodiments of the end cap fibers disclosed herein advantageously may be used in counter-directionally pumped amplifiers to couple pump light through the end cap and thereby into the pump guide of the amplifier fiber.

FIG. 6 further illustrates an alternative embodiment of end termination using a fiber 6101 drawn from, for example, the preform 3000. The fiber 6101 has a pump guide, and has a similar outer diameter as the fiber 6100. A splice 6102 is performed between the fibers 6100 and 6101. The splice 6102 is then put into a ferrule 6003 for protection. In some embodiments, glue can be used to fix the fibers 6100, 6101 in the ferrule 6003. In some embodiments, an end of the assembly is polished for an optical finish. The end face may be polished, for example, at an angle other than 90 degrees to the axis of the fiber to reduce or minimize reflection. In some embodiments, the fiber 6101 can be angle-cleaved before insertion into the ferrule 6003. A signal from the fiber 6100 is similarly expanded while propagating in the fiber 6101, as described above. Pump power is coupled into the pump guide of the fiber 6101 and is then transferred to the pump guide of the fiber 6100 at the splice 6102.

FIG. 6 further illustrates another alternative embodiment of end termination. An all glass multi-clad LCF 6200 is spliced at splice 6203 to a fiber 6201 made from, e.g., the preform 3000. In this example, the fiber 6200 has a protective coating 6204. The example fiber 6201 does not have a guiding core but has a pump guide having a numerical aperture matched to that of the fiber 6200. Single mode output is expanded by diffraction while propagating along the fiber 6201 after leaving the fiber 6200, as described above. This expansion advantageously may reduce optical intensity at the output end of fiber 6201 to reduce and/or minimize surface damage. The fiber 6201 has a pump guide, so pump light can be coupled into the pump guide of the fiber 6201, which is then transferred to the pump guide of the fiber 6200. In various embodiments, the splice 6203 can be performed by electric arc, resistance heater or other forms of heating. A ferrule 6205 may be placed over the splice 6203 to provide protection. The ferrule 6205 preferably may be made from a glass with matching thermal expansion coefficient to that of fibers 6200 and 6201 and/or with an inner diameter closely matched to the outer diameters of fibers 6200 and 6201. In the illustrated embodiment, a second ferrule 6206 with an inner diameter close to the outer diameters of the ferrule 6205 and the coating 6204 is placed over ferrule 6205 and a length of coating 6204 for further protection. As described above, glue can be used for fixing the ferrules to each other and/or to the fiber. Ferrules 6205 and 6206 can made in one piece and/or can be pre-glued together for easy assembly.

Figure 7A:
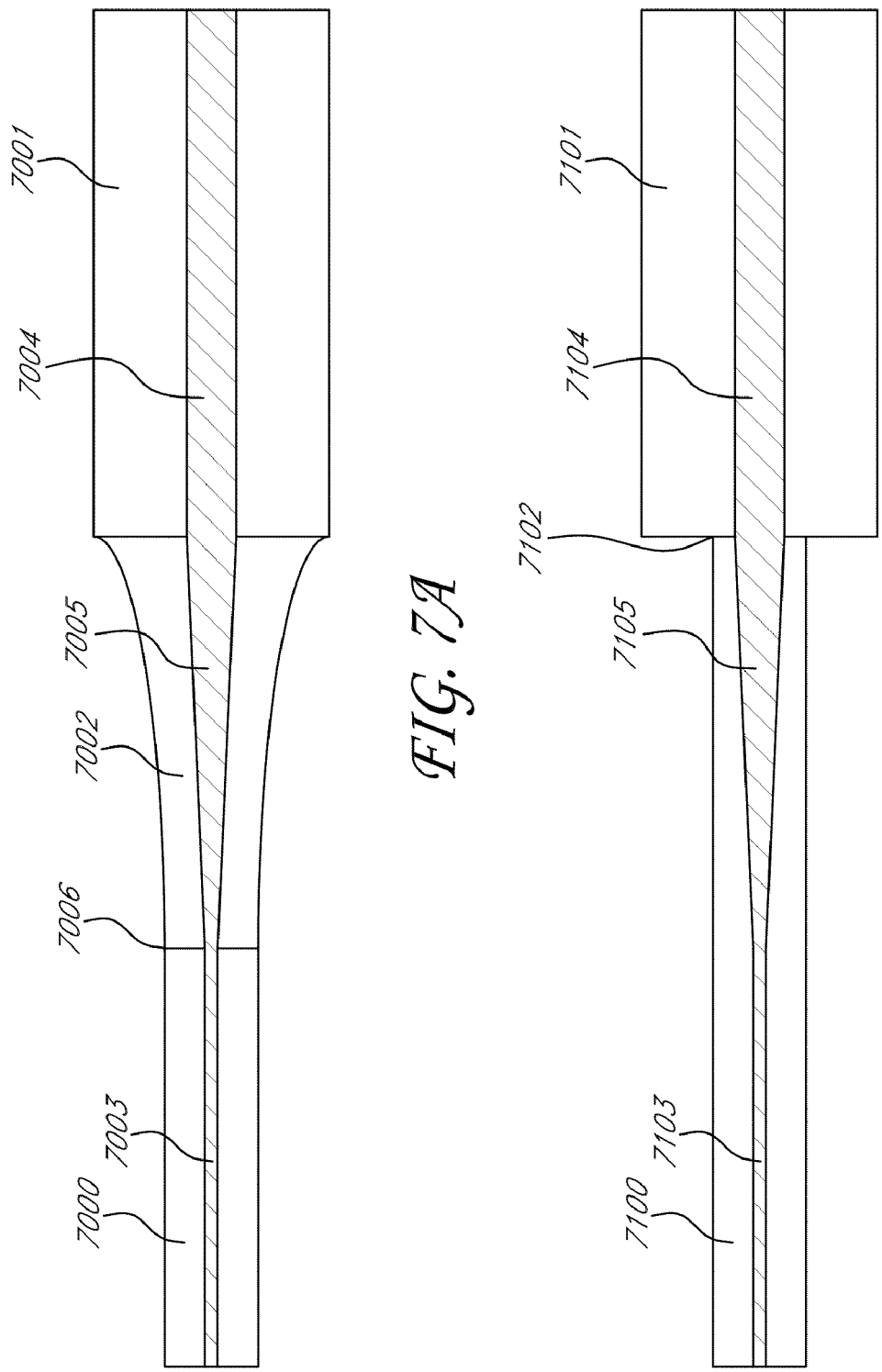
FIGS. 7A and 7B schematically illustrate various examples of seed injection arrangements from a SM fiber to an LCF.
Figure 7B:
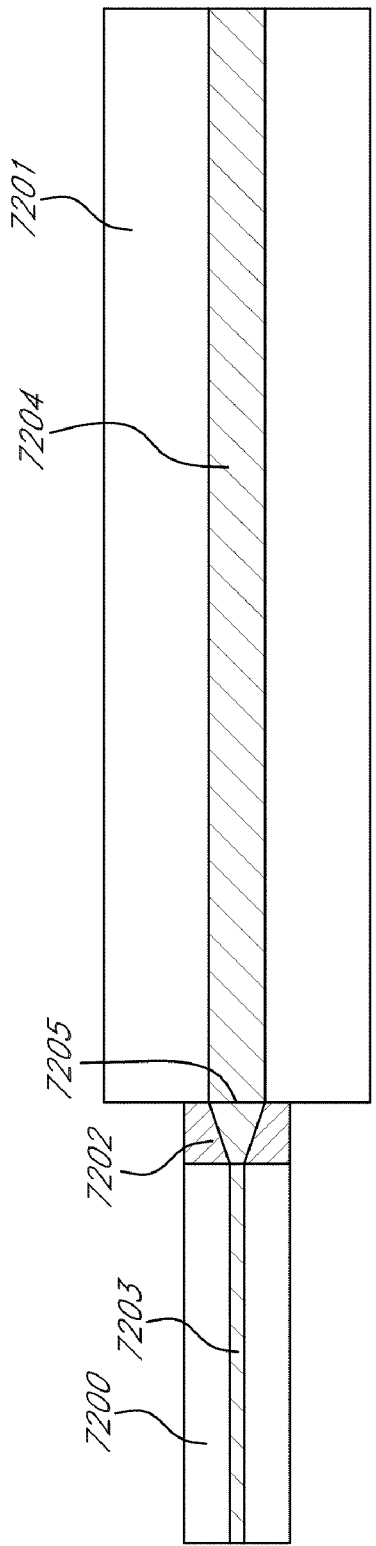
Figure 7B:
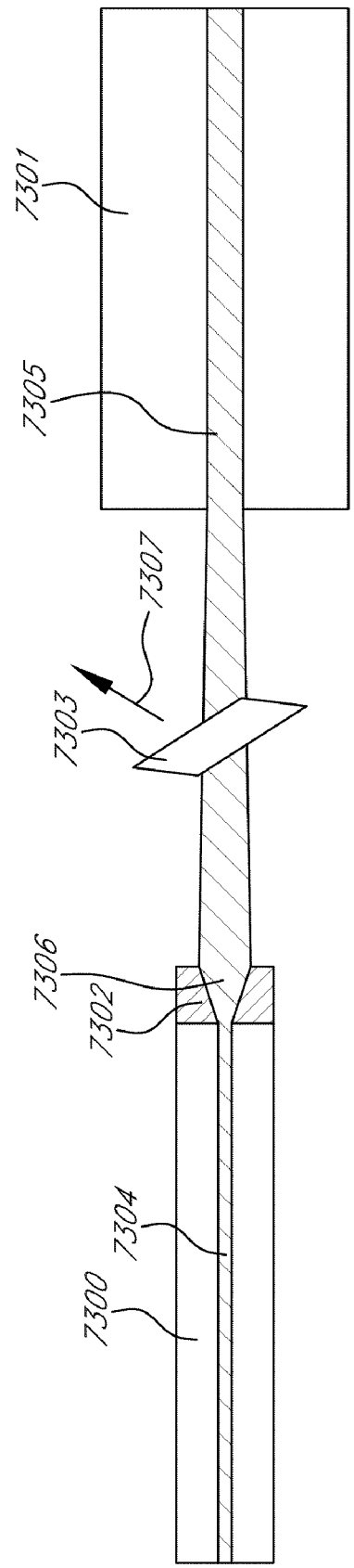

FIGS. 7A and 7B schematically illustrate examples for coupling signal into the input end of a fiber amplifier. In a first example schematically illustrated in FIG. 7A, a fiber 7000 has a single mode core 7003 for carrying a signal. Fiber 7001 is an all glass multi-clad LCF with a large core 7004. A tapered section 7002 is made between the two fibers 7000 and 7001 to change the mode size along the tapered section 7002 so that the mode is matched to the fibers 7000 and 7001 at the two respective ends of the tapered section 7002. The tapered section 7002 may provide for low connection losses. In some embodiments, the tapered section 7002 may contain more than one sub-section. In some of these embodiments, a section next to the end of the fiber 7001 can be made from part of the fiber 7001. The end of the tapered section 7002 towards the fiber 7000 may be spliced to the fiber 7000 in some embodiments.

In a second example embodiment schematically illustrated in FIG. 7A, a single mode fiber 7100 has a core 7103 and a portion 7105 that has a cross-sectional size that is axially varying and thermally expanded to expand its mode so that it is better matched to that of the fiber 7101 at splice 7102.

In a third example embodiment schematically illustrated in FIG. 7B, a fiber 7200 comprising a core 7203 has a micro lens, graded index lens, and/or multimode lens 7202, which is attached or spliced to an end of the fiber 7200 to expand its mode before connecting to a fiber 7201 at a splice 7205. An advantage of using the lens 7202 is that the mode size exiting the lens 7202 can be matched to the core 7204 of the fiber 7201. In a fourth example embodiment schematically illustrated in FIG. 7B, a micro lens, graded index lens, and/or multimode lens 7302 is attached to a fiber 7300 so that the beam 7306 exiting its core 7304 is focused and travels through free space before entering core 7305 of fiber 7301. In this arrangement, a beam splitter 7303 or another optical element such as isolator can be inserted in the beam path. For example, in the case of the beam splitter 7303, a pump beam 7307 exiting the fiber 7305 can be separated out. Alternatively, pump light can be injected into the fiber 7301 through the beam splitter 7303. In some embodiments, the position of the pump and the fiber 7300 can also be swapped so that signal is reflected off the beam splitter 7303 instead of the pump.

Figure 8A:
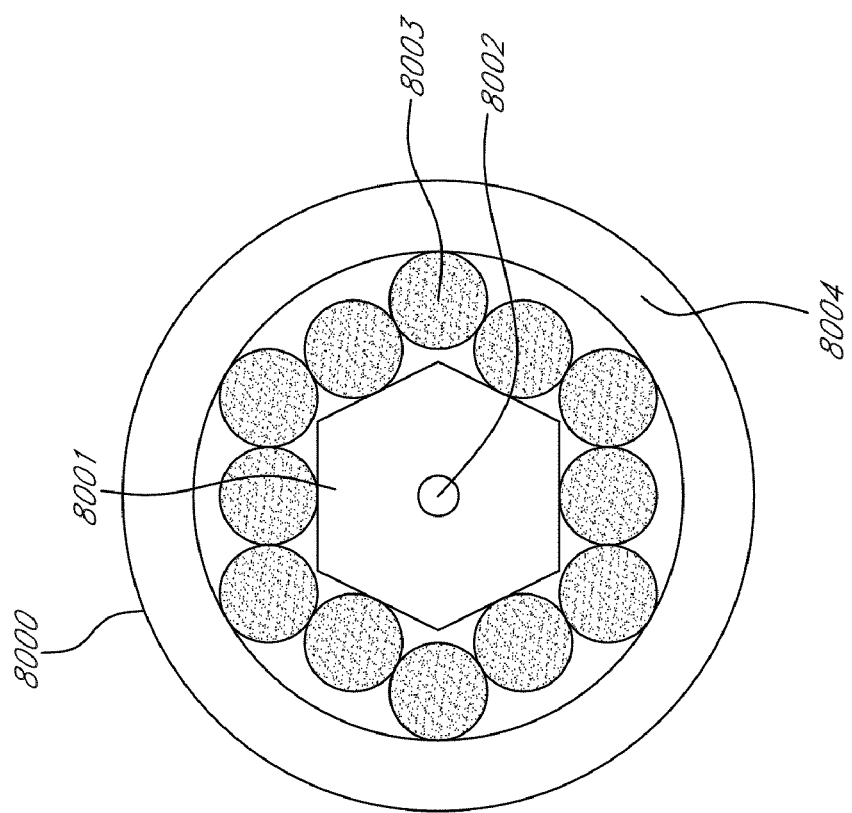
FIGS. 8A-8D schematically illustrate various examples of preforms from which multi-clad fibers can be drawn.

Embodiments of glass multi-clad LCF can also be used for other types of fibers such as, for example, conventional fibers and photonic crystal fibers. FIGS. 8A-8D schematically illustrate various embodiments of preforms that can be used to make fibers. As schematically illustrated in FIG. 8A, a preform 8000 comprises a conventional preform 8001 with a hexagonal outer shape, or some other outer shape designed, e.g., for pump mode mixing, with a core 8002. The hexagonal shape can be provided by, e.g., grinding. Pump clad rods 8003 with lower refractive index than the conventional preform 8001 substantially surround the conventional preform 8001 and are further enclosed in a tube 8004. A fiber can then be drawn from the preform 8000.

U.S. Pat. No. 6,954,575, issued Oct. 11, 2005, entitled "Single-Polarization High Power Fiber Lasers and Amplifiers" discusses various examples of cladding shapes that may be used to produce a substantially uniform pump absorption coefficient along at least a portion of the fiber length (see, e.g., Snitzer et al., in U.S. Pat. No. 4,815,079; Martin H. Muendel et al., U.S. Pat. No. 5,533,163; D. J. DiGiovanni et al., U.S. Pat. No. 5,966,491 and; S. Grubb et al., U.S. Pat. No. 6,157, 763). In Snitzer, et al., a rectangular cladding with a single-mode core has been suggested, in Muendel et al., a polygon that tiles a plane has been suggested for a cladding shape, and in Grubb et al., two perpendicular planes at the outside of the inner fiber cladding provide uniform pump absorption. In D. J. DiGiovanni et al., a triple cladding provides uniform pump absorption, where the first cladding has an asymmetrical shape, the second cladding is round and the third cladding material is a polymer coating material. In addition DiGiovanni also suggests the implementation of non-circular stress-producing regions into the first cladding.

U.S. Pat. No. 6,954,575 also discloses various cladding arrangements for distribution of pump light. By way of example, a first cladding shape may have a cross sectional shape in form of a pentagon, a heptagon, a non-diametrically symmetric, non-equilateral hexagon, a non-diametrically symmetric, non-equilateral octagon, or a polygon with (2n−1) sides, where n>4.

Various embodiments of all glass multi-clad large core optical fibers described herein provide for distribution of pump light without using polygonal constructions, for example, polygons with large n. However, in some multi-clad embodiments a polygonal construction may be utilized in combination with various arrangements as set forth herein.

Figure 8B:
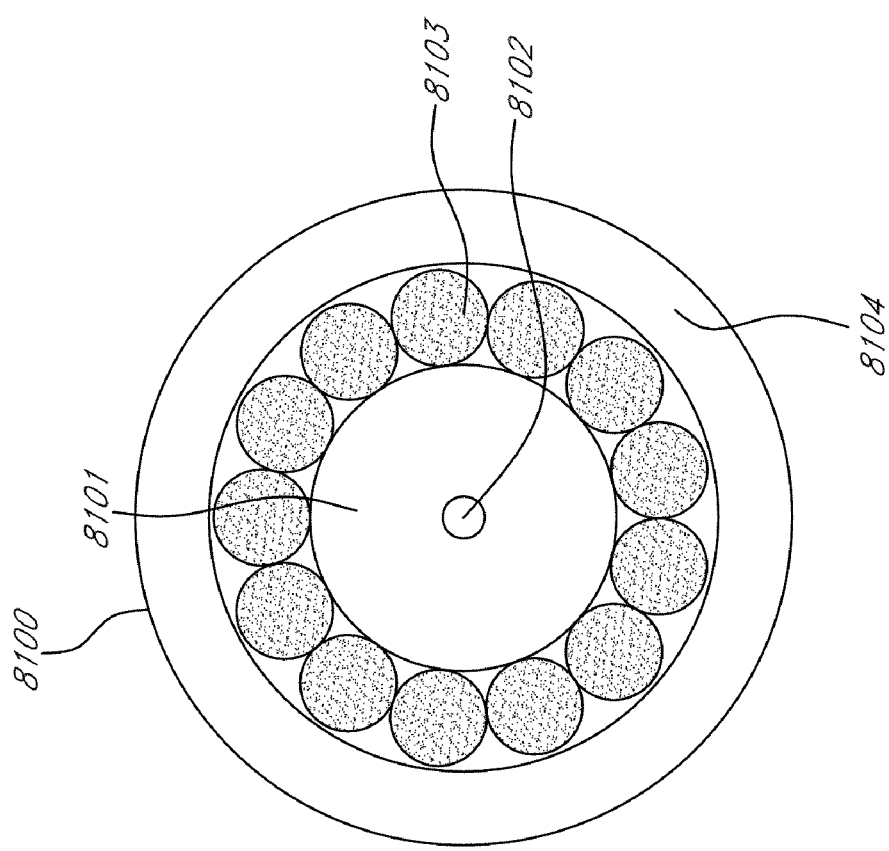

FIG. 8B schematically illustrates another embodiment which, in some cases, provides for increased mode mixing. A preform 8100 comprises a conventional preform 8101 with a circular outer shape and a core 8102. Pump mode mixing in fiber drawn from the preform 8100 is performed by the corrugated pump cladding boundary provided by the use of pump clad rods 8103. Without subscribing to any particular theory, the corrugated (or wavy) boundary construction may scatter pump modes in a manner similar to that of a polygon having large number of sides, n. In some embodiments the mode mixing may greatly exceed that obtainable with a polygon having a large number of sides, for example, where the number of sides of a polygon match the number of rods. The pump clad rods 8103 may comprise lower refractive index material than the preform 8101 and may be configured as one or more layers for a pump guide. The stack including the conventional preform 8101 and the pump clad rods 8103 may be disposed in a tube 8104.

Figure 8C:
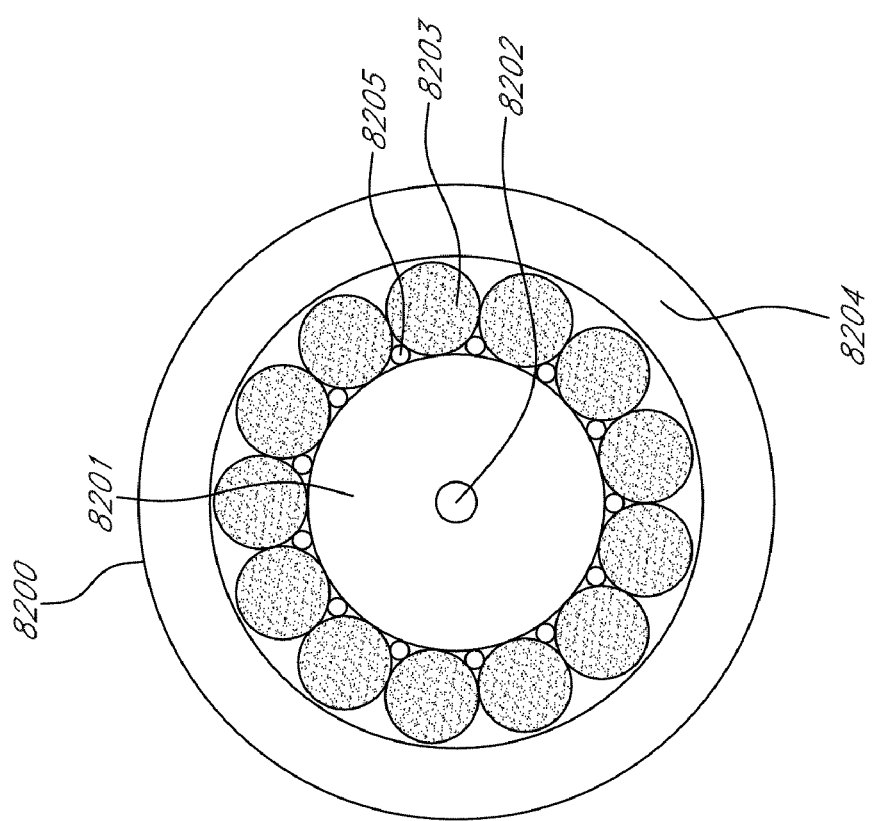

With reference to FIG. 8C, in certain embodiments, small rods 8205 can also be added to increase the amount of waviness of a pump cladding boundary in a fiber drawn from preform 8200. For example, the preform embodiment 8200 comprises a conventional preform 8201 having a core 8202. The conventional preform 8201 is surrounded by pump clad rods 8203 and tube 8204. In this example, the small rods 8205 are disposed in spaces between the pump clad rods 8203 and the outer surface of the conventional preform 8201. In the illustrated embodiment, the small rods 8205 are disposed between each adjacent pair of pump clad rods 8203. In other embodiments, a different number of small rods 8205 may be used. For example, small rods 8205 may be disposed between only certain selected pairs of pump clad rods 8205. In other embodiments, in addition to or instead of the configuration of small rods schematically illustrated in FIG. 8C, one or more small rods 8205 can be disposed in spaces between the pump clad rods 8203 and the inner surface of the tube 8204. Shapes of conventional preform other than shown in FIG. 8C may be used, such as, triangular, square, pentagon, heptagon, octagon, etc. Other derived shapes and irregular shapes are also possible.

Figure 8D:
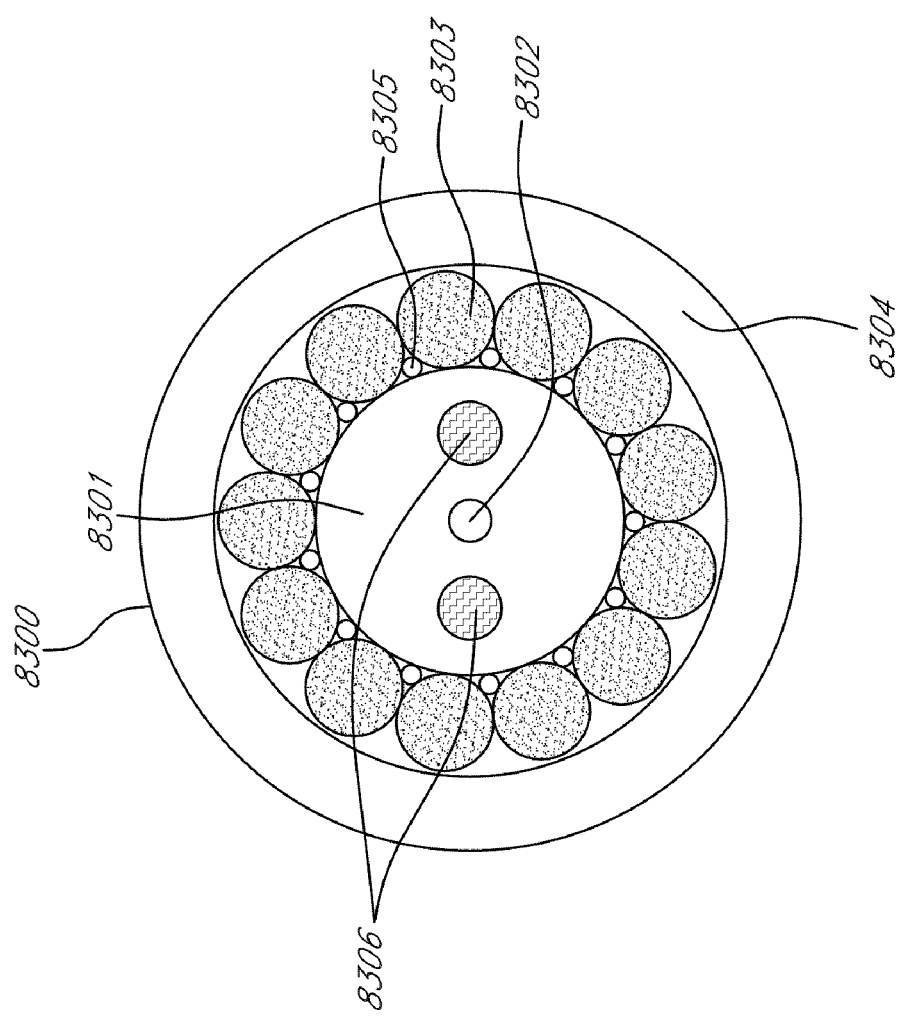

As schematically illustrated in FIG. 8D, in some embodiments, a preform 8300 comprises a conventional preform 8301 comprising one or more stress rods 8306 disposed on either sides of a core 8302. The preform 8300 also comprises pump clad rods 8303, small rods 8305, and tube 8304. Fibers drawn from the preform 8300 may provide for polarization maintaining behavior. As described above, the number and/or arrangement of the stress rods 8306 may be selected to provide a desired birefringence.

In certain embodiments, preforms generally similar to preforms 8000, 8100, 8200, and 8300 may be configured with a pump guide and without a guiding core (e.g., as described above for preforms 3000 and 3100). Such embodiments advantageously may be used for end terminations as described, e.g., with respect to FIG. 6.

Figure 8E:
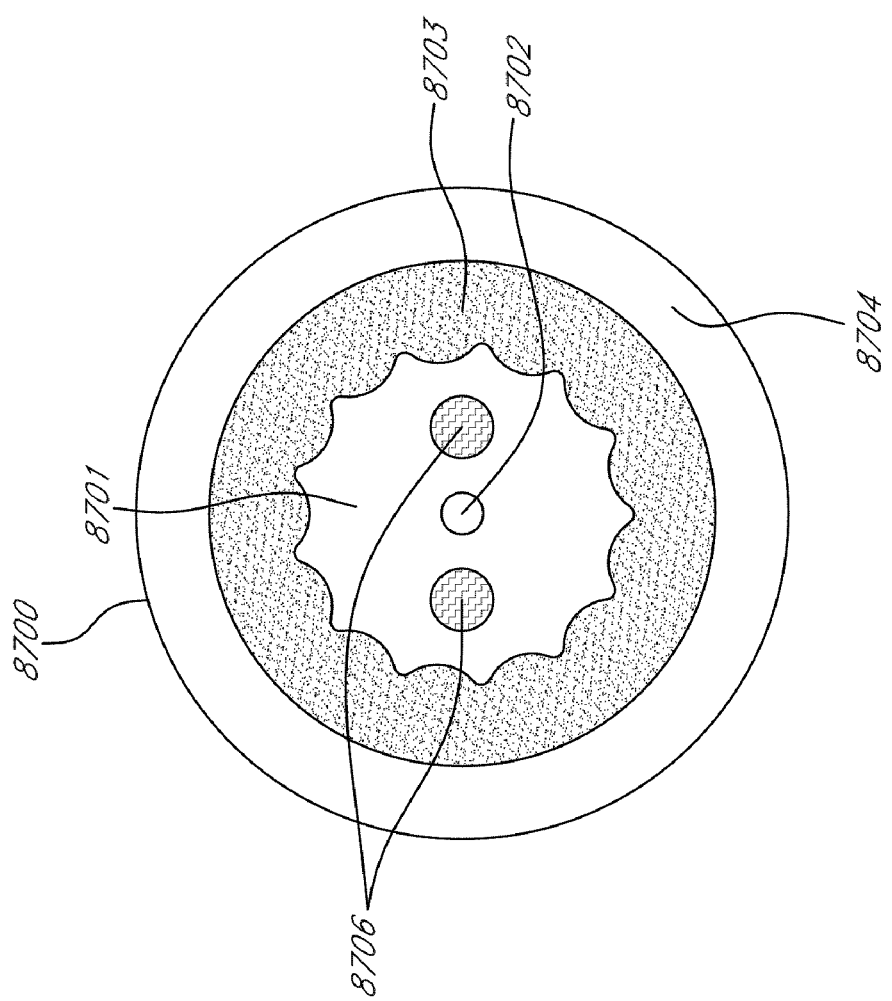
FIG. 8E schematically illustrates an example multi-clad fiber based on, at least in part, an embodiment of the preform schematically illustrated in FIG. 8D.

FIG. 8E schematically illustrates an example of a multi-clad fiber 8700 based on, at least in part, an embodiment of the preform 8300 shown in FIG. 8D. The fiber 8700 comprises an outer cladding 8704, a pump cladding 8703, a core 8702, and a first cladding 8701. In some embodiments, the first cladding 8702 may comprise glass with a lower refractive index than the refractive index of the core 8702. The first cladding 8701 may comprise stress rods 8706 for providing PM behavior. This example illustrates a corrugated shape for an inner boundary of the pump cladding 8703. In some embodiments, at least a portion of the core 8701 is doped to provide gain. In certain embodiments, the fiber 8700 comprises an all glass fiber.

In the embodiments shown in the figures, circular rods are used in the example preforms. In other embodiments, cross sections and/or sizes of the individual rods can differ from each other and can include many other regular and/or irregular shapes including, for example, polygons, ovals, ellipses, etc. Additionally, the number, type, and/or arrangement of rods may be different than described and shown in the figures.

In certain embodiments, the background glass comprises silica and some or all of the first cladding comprises fluorine-doped glass. In some embodiments, a relative refractive index difference up to $10^{-2}$ can be obtained with doping silica glass with a dopant (e.g., fluorine or boron) or a combination of dopants such as, e.g., fluorine and boron. Other dopants may be used. Additionally, other silica glasses can also be used. Additionally, non-silica glasses, such as phosphate glass, tellurite glass, chalcogenide glass, bismuth glass, fluoride glass etc. can also be used to implement the designs with low relative refractive index difference. Other materials may also be used. In some embodiments, fibers drawn from embodiments of the disclosed preforms may comprise a guiding core in which some or all of the core is doped with a dopant such as, e.g., a rare earth element such as erbium, ytterbium, and so forth. Combinations of dopants may be used. The doped core may provide gain. Certain embodiments may be configured as an "all glass" fiber.

Referring again to FIGS. 2A, 2A, and 8E, the inner boundary of respective pump claddings 2505, 2605, and 8703 advantageously may provide in certain embodiments for enhanced pump mode mixing as a result of localized multiple reflections over the cladding region. The examples generally show inner cladding boundaries comprised of continuous and connected linear or curved boundary portions. The boundary may be polygonal or have polygonal portions (e.g., line segments) but is not necessarily so restricted. In some embodiments, the pump cladding may comprise one or more pump cladding features, and the inner boundary of the pump cladding may not be continuous and connected in such embodiments.

Figure 9A:
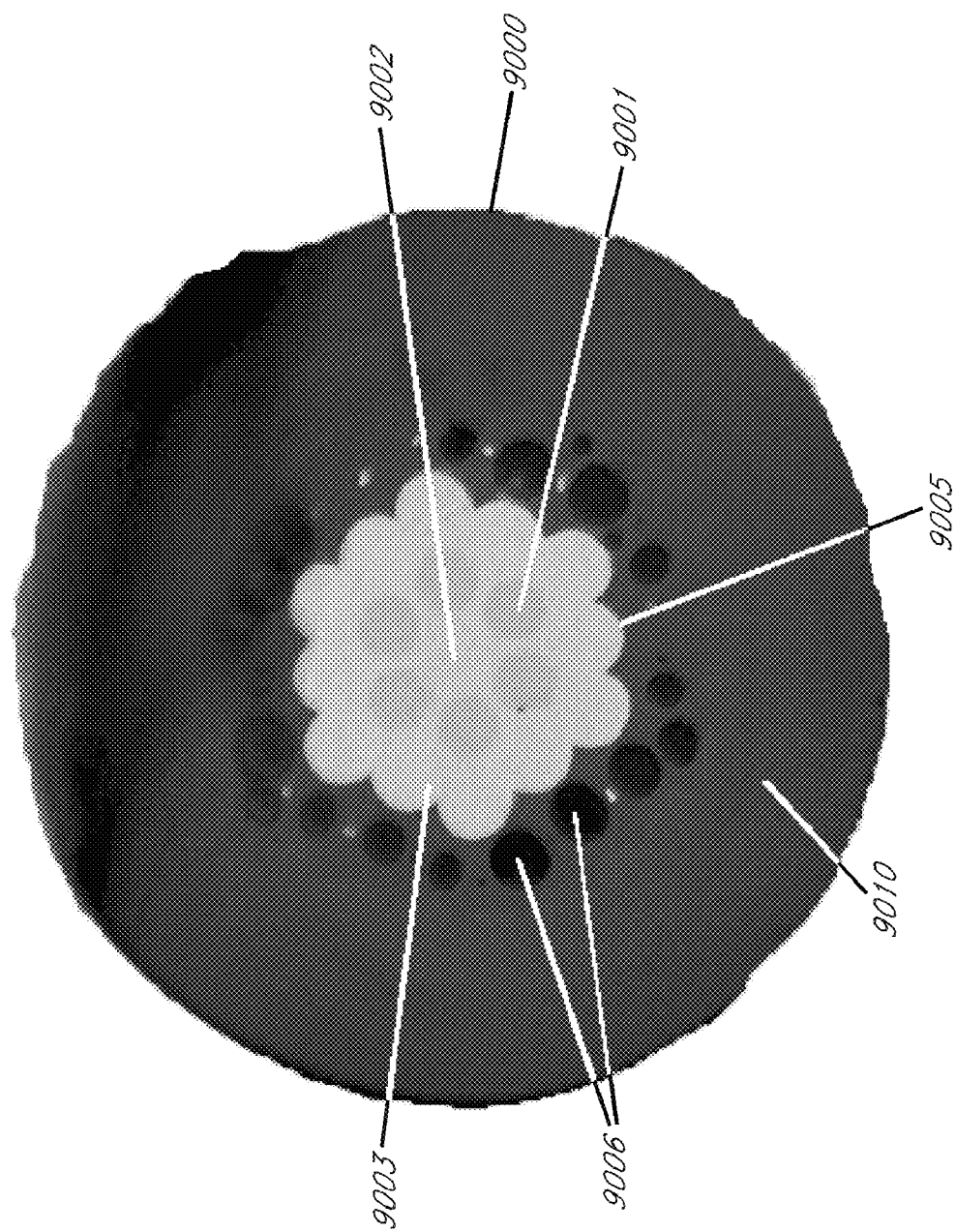
FIGS. 9A and 9B are photographs that show an example of a fabricated large-core multi-clad fiber.
Figure 9B:
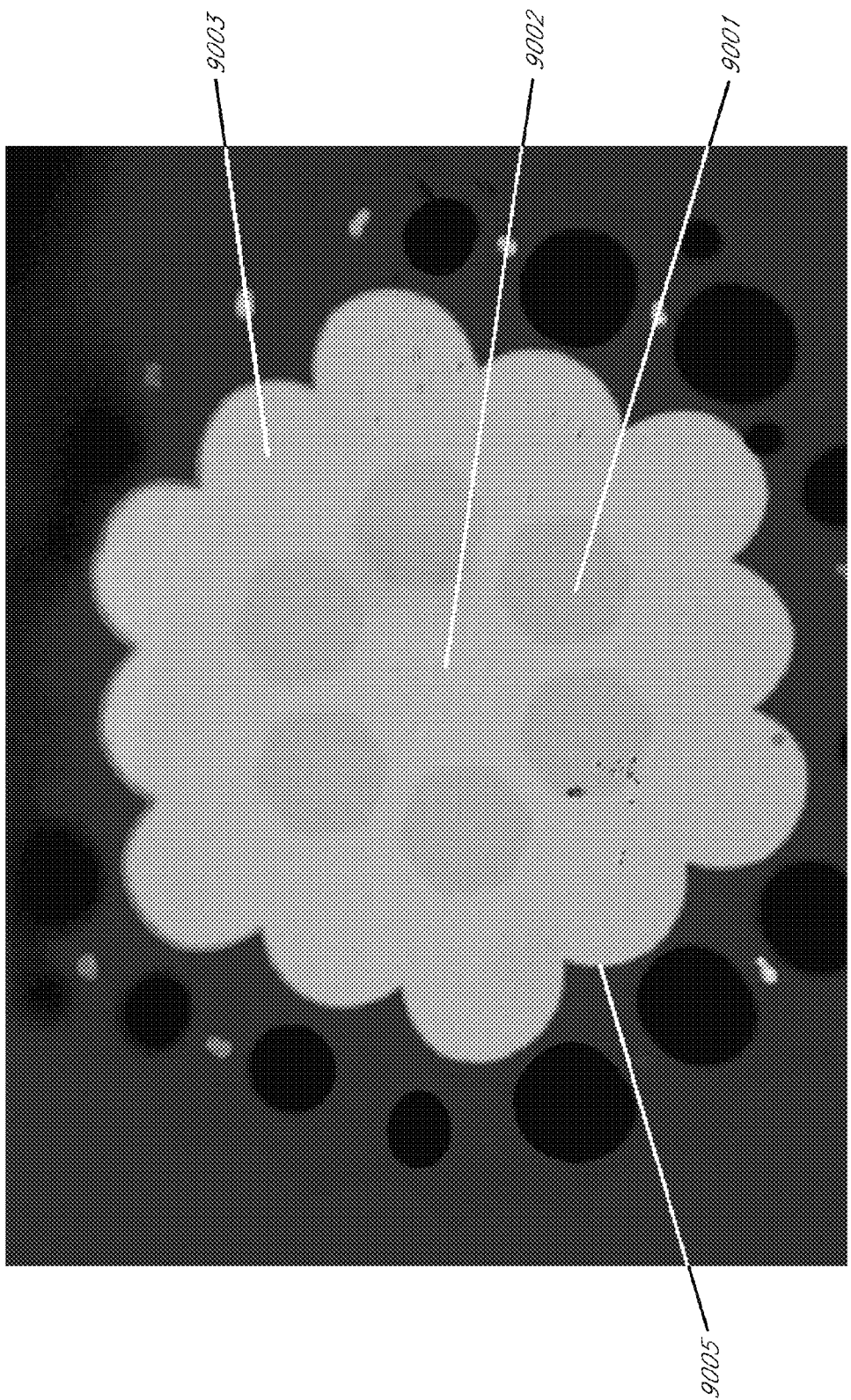

FIGS. 9A and 9B are photographs that show cross sections of an example of a fabricated multi-clad fiber 9000. FIG. 9B shows a close-up view of the central portions of the fiber shown in FIG. 9A. Construction of the fiber 9000 was carried out using a method of construction of leakage fibers generally similar to certain methods described, for example, in the '478

Application and the '668 Application (each of which is incorporated by reference herein in its entirety). For example, a fluorine-doped silica rod can be inserted into silica tubes to be drawn into canes with desired diameters and desired ratios of fluorine-doped silica to silica glass. The canes along with silica canes can be stacked in a hexagonal stack in the desired configuration. The stack can be inserted into a silica tube to be drawn into fibers. Vacuum inside the silica tube is sometimes used in combination with low drawing temperatures to produce non-circular (e.g. hexagonal fibers) fibers. Ytterbium-doped silica rods or/and stress rods are sometimes used in the stack to make ytterbium-doped fiber or/and polarization maintaining fiber. Further details of various stack-and-draw processes that may be used to fabricate multi-clad fibers (such as, e.g., the fiber 9000) are described in U.S. Patent Publication No. 2008/0069508, "Rare Earth Doped and Large Effective Area Optical Fibers for Fiber Lasers and Amplifiers," to Dong, et al., published Mar. 20, 2008, which is hereby incorporated by reference herein in its entirety. Materials of the rods, capillaries, tubes, etc. of the preform are generally related to materials of the respective portions (e.g., core, claddings, pump guides, etc.) of the fiber drawn from the preform.

The core 9002, first cladding features 9001, second cladding 9003, pump cladding having an inner boundary 9005 are shown in FIGS. 9A and 9B. Some unwanted air holes 9006 exist in the outer cladding 9010. In other embodiments, methods to eliminate such bubbles in glass may be used. Such methods include, for example, use of helium gas instead of air, increasing the feed rate during drawing, lower drawing temperature, or a combination of these.

The pump cladding inner boundary 9005 of the example fiber 9000 shows somewhat smooth curved regions, and schematic illustrations of FIGS. 2A, 2B, and 8E show linear segments, sharp corners, an overall polygonal shape with a large number of sides (e.g., in FIGS. 2A and 2B), and with a large number of curved arcs (FIG. 8E). The curvature of a portion of the pump cladding inner boundary (e.g., convex or concave) can depend on the details of the preform stack (including, e.g., cross-sectional shapes of the rods in the preform), the materials used in the stack, and so forth. As used herein, whether a portion of a boundary is concave or convex is determined as "viewed" from within the boundary (e.g., as viewed from the core of the fiber).

The distribution of pump modes is dependent on several factors including, for example, the number of modes, modal distribution, and launch conditions. The inner (and/or outer) boundary of the pump cladding and/or variations in angle of incidence can provide mode-mixing. Therefore, a polygonal structure having a large number of concave portions, and/or a large number of convex portions, and/or a large number of sides and/or curved regions can be beneficial in some embodiments. Such alternatives result in rapid changes in direction along the pump cladding boundary relative to conventional double clad fiber arrangements. For example, one possible figure of merit for mode-mixing may comprise the rapid changes in slope change along the pump cladding inner boundary. Another possible figure of merit may comprise a measure of a radial (and/or azimuthal) distance over which a region of the boundary extends.

In various embodiments of fiber, a large number of directional changes and/or large slope changes may be provided. For example, the example fabricated fiber 9000 shows twelve curved, concave crest regions having a trough region between adjacent curved, concave regions. The trough regions show a relatively rapid and distinct change in slope. In this example fiber, the trough regions are angularly narrow and have a generally inwardly pointed shape. The "point" of the trough may be slightly rounded (see, e.g., FIG. 9B). The point of the trough may comprise a convex region (see, e.g., FIG. 9B). In the example fiber 9000, each of the curved, concave regions has a boundary with a shape that is approximately an arc of a circle. In other fiber embodiments, other boundary shapes of the regions are possible including, e.g., oval, polygonal, and so forth. Similarly, the schematics (e.g., FIGS. 2A, 2B, and 8E) also illustrate numerous rapid slope changes. Although the example fiber 9000 shows an inner pump cladding boundary having twelve curved regions, a different number of curved regions (or regions having relatively rapid slope changes therebetween) can be provided in other embodiments such as, e.g., 13, 14, 15, 16, 17, 18, 19, 20, or more. Fewer numbers of curved regions (or regions having relatively rapid slope changes therebetween) are used in other embodiments such as, e.g., 11, 10, 9, 8, 7, 6, or fewer. Further, the regions can be disposed additionally or alternatively on an outer boundary of the pump cladding.

Accordingly, embodiments of the fiber disclosed herein may have a pump cladding with a corrugated inner boundary which may be very beneficial for pump mode mixing and may serve to increase pump absorption by coupling skew rays into rays intersecting the doped core of the fiber. In some embodiments, the corrugated inner boundary comprises a number of alternating crests and troughs. For example, in at least one embodiment, the corrugated boundary comprises twelve crests that alternate with twelve troughs. Greater numbers of alternating crests and troughs can be provided in some fiber embodiments, e.g., 13, 14, 15, 16, 17, 18, or more. Also, fewer numbers of alternating crests and troughs can be provided in some fiber embodiments, e.g., 11, 10, 9, 8, 7, or fewer. In certain embodiments, a crest comprises at least a portion of a concave region of the pump boundary. In certain embodiments, a trough comprises at least a portion of a convex region of the pump boundary. The angular and/or radial extents and/or the shapes of some or all of the crests and/or troughs of an inner boundary can be substantially the same or can be different. For example, in the embodiment shown in FIGS. 9A and 9B, there are twelve crests that are substantially circular arcs. The angular extents of the crests in this embodiment are in a range of about twenty degrees to about thirty degrees. Between adjacent crests, there is a respective trough, which is much narrower in angular extent (e.g., as can be seen in FIG. 9B, the troughs comprise generally inwardly pointed regions). In some embodiments, a trough (or a crest) may comprise a region in which the slope of the boundary rapidly changes direction. Accordingly, in some embodiments, adjacent crests (or adjacent troughs) may appear to be separated by a region that exhibits a rapid and distinct change in slope of the inner boundary.

The regions of the pump cladding boundary can have a radial (and/or azimuthal) extent. For example, the radial extent of a boundary region may be measured in terms of, among other factors, the difference between a maximum distance of the boundary region from the core and a minimum distance of the boundary region from the core. In some embodiments, the radial extent can be measured in terms of a fractional amount. For example, in some cases, the radial extent can be the difference between the maximum and minimum distances of the boundary region from the core divided by the minimum distance of the boundary region from the core. In certain embodiments, the fractional radial extent of pump cladding boundary regions is in a range from about 5% to about 25%, in a range from about 5% to about 20%, in a range from about 10% to about 15%, or some other range. An example of a measure of an angular extent of a boundary region is the angle subtended by the region, where the angle is measured from the core of the fiber. In certain embodiments, the angular extent of boundary regions is in a range from about 20 degrees to about 60 degrees, in a range from about 25 degrees to about 45 degrees, or some other range. In some embodiments, the angular extent of one or more regions is about 30 degrees. Other measures of the radial and/or azimuthal extent can be used.

The enhanced mode mixing is a surprising and beneficial result of preform embodiments utilizing the pump cladding rods to form a fiber having a pump guide as illustrated in various embodiments herein.

Embodiments of the fibers disclosed herein may be utilized in many optical systems including amplifiers, lasers, short or ultrashort pulse generators, Q-switched lasers and other systems.

Figure 10A:
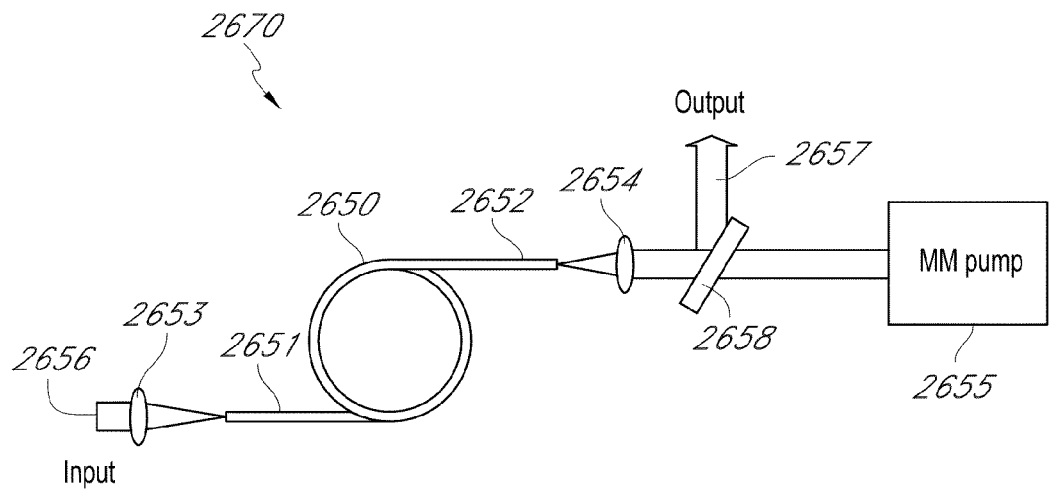
FIG. 10A schematically illustrates an embodiment of a multi-clad fiber amplifier system that comprises an embodiment of a multi-clad fiber disclosed herein.

For example, FIG. 10A schematically illustrates one possible embodiment of a multi-clad fiber amplifier system 2670 comprising a fiber amplifier or a laser pumped by a multimode pump source. In various embodiments, the fiber amplifier or the laser comprise an embodiment of any of the multi-clad optical fibers described herein. In the example fiber amplifier system shown in FIG. 10A, the fiber 2650 has straight input and output ends 2651, 2652 and a coiled section therebetween. A multimode pump 2655 is used to pump the amplifier or laser using a coupling lens 2654. Input beam 2656 is launched into the fiber 2650 through a lens 2653. Output 2657 is separated by dichroic mirror 2658. Some embodiments of the fiber amplifier system 2670 implement embodiments of end termination at an output end of the fiber laser or fiber amplifier as described, for example, with reference to FIG. 6. Some embodiments of the fiber amplifier system 2670 are configured to couple signal into the input end of the fiber amplifier or the fiber laser as described, for example, with reference to FIGS. 7A and 7B. Other variations and configurations of the fiber amplifier system are possible.

Embodiments may be used in systems for laser based modification of metal, semiconductor, and dielectric materials utilizing infrared, visible, and/or UV wavelengths. Other applications are also possible.

Figure 10B:
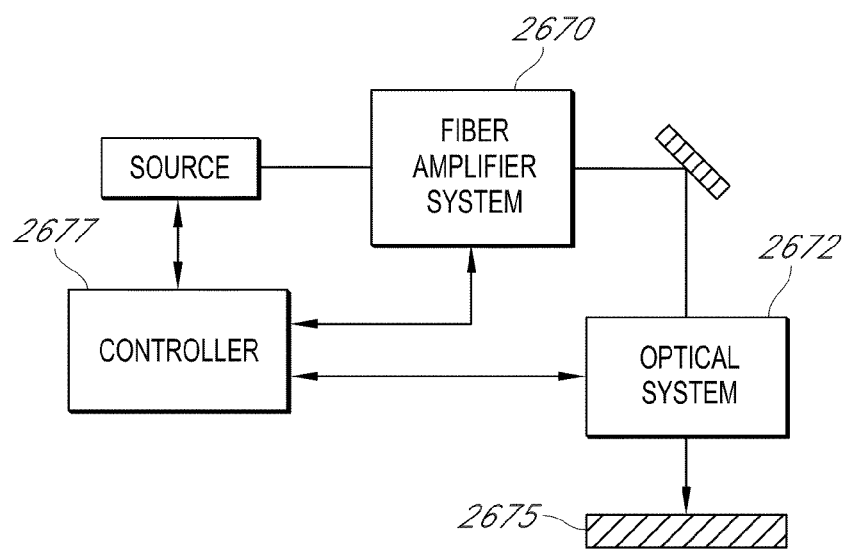
FIG. 10B schematically illustrates an embodiment of a laser-based material processing system utilizing an embodiment of a multi-clad fiber amplifier system.

For example, FIG. 10B schematically illustrates an example of a laser-based material processing system which may be configured with the multi-clad fiber amplifier system 2670 of FIG. 10A. The system 2670 may also be configured as a multistage amplifier (not shown). The optical system 2672 may deliver an approximately diffraction limited beam to target 2675. The spot size will generally be application dependent, but may be in the range from about 1 μm to 250 μm. The optical system 2672 may also include scan mirrors or other suitable beam positioning equipment. Target 2675 may also be mounted on a translation and/or rotary positioning stage. Controller 2677 coordinates operation of the laser, optical system, and any positioning mechanism. Other variations and configurations of the material processing system are possible.

ALTERNATIVE EXAMPLES, EMBODIMENTS, AND APPLICATIONS

At least one embodiment includes a multi-clad fiber where a pump cladding is formed by stacking a layer of low index rods in a preform.

At least one embodiment includes an assembly where a fiber with a pump guide is spliced to a large core amplifier fiber for expanding the beam size before it reaches the end face of the fiber and injection of pump power.

At least one embodiment includes a multi-clad fiber amplifier system. The amplifier system includes a pump source to pump said fiber amplifier and an optical fiber having a core and a pump cladding. The pump cladding includes a continuous pump cladding inner boundary having frequent and distinct changes in slope along said boundary. The pump cladding is configured to mix pump modes and scatter or reflect pump energy into the core. The system may include a pump source configured to pump the optical fiber.

In various embodiments, the multi-clad fiber amplifier system also includes an end cap fiber attached to an end of the optical fiber. The end cap fiber can have a pump guide that is substantially matched to the pump cladding of the optical fiber. In some embodiments, the end cap fiber does not have a guiding core. The pump guide of the end cap fiber can be configured to receive pump light from the pump source.

In various embodiments of a multi-clad fiber:

A pump cladding inner boundary includes a combination of linear and non-linear portions.

A pump cladding inner boundary includes at least twelve boundary portions, including at least one of a linear and curved portion. A pump cladding inner boundary can include at least six boundary portions, including at least one of a linear and curved portion. One or more of the portions can be concave and/or convex. A radial extent of at least one of the boundary portions is in a range from about 5% to about 25%.

In some embodiments, the pump cladding inner boundary comprises a corrugated inner boundary comprising a plurality of linear or curved segments along the inner cladding boundary that form at least twelve crests that alternate with at least twelve troughs. In some embodiments, a radial extent of at least one of the crests or a radial extent of at least one of the troughs is in a range from about 5% to about 25%. One or more of the crests may comprise a concave portion of the boundary. One or more of the troughs may comprise a convex portion of the boundary.

Embodiments of the multi-clad fiber may be "all glass."

At least one embodiment includes a preform for a fiber. The preform includes an inner region having one or more layers of rods formed from a background material. One or more layers of pump cladding rods substantially surround the inner region. The pump cladding rods are formed from a material with a refractive index lower than the refractive index of the background material.

In various embodiments of a preform:

A preform includes an outer tube substantially surrounding the one or more layers of pump cladding rods.

An inner region includes a central core rod and one or more layers of first cladding rods substantially surrounding the central core rod, and the first cladding rods include material having a refractive index lower than the central core rod.

One or more of the first cladding rods include stress rods.

One or more of the first cladding rods include an inner rod disposed within a capillary formed from the background material, with the inner rod formed from material having a lower refractive index than the background material.

Background material includes a silica glass and a pump cladding material includes fluorine-doped silica glass.

At least one embodiment includes a fiber drawn from any one of the preforms described herein.

At least one embodiment includes an optical system having a fiber drawn from any one of the preforms described herein.

At least one embodiment includes a multi-clad fiber. The fiber includes an outer cladding that substantially surrounds a pump cladding that substantially surrounds a second cladding that substantially surrounds a first cladding having first cladding features. The first cladding substantially surrounds a core and the pump cladding has a corrugated inner boundary comprising a plurality of linear or curved segments.

In various embodiments of a multi-clad fiber:

A multi-clad fiber is configured as a leakage channel fiber (LCF).

Adjacent segments of an inner boundary have substantially different slopes.

A corrugated inner boundary is configured to provide pump mode mixing.

At least one of the first cladding features includes a stress rod.

A pump cladding is formed from fused silica doped with fluorine.

At least a portion of the corrugated inner boundary has a radial extent in a range from about 5% to about 25%.

A wide variety of alternative fiber and/or preform configurations are also possible. For example, components (e.g., layers, claddings, rods, etc.) may be added, removed, or rearranged. In different embodiments, the number of claddings in a multi-clad fiber may be different, e.g., two, three, four, five, or more claddings. Similarly, processing and method steps may be added, removed, and/or reordered.

In some embodiments, the corrugated inner boundary comprises a plurality of alternating crests and troughs.

In some embodiments, the corrugated inner boundary comprises at least twelve crests that alternate with at least twelve troughs.

In some embodiments, a radial extent of at least one of the crests or a radial extent of at least one of the troughs is in a range from about 5% to about 25%.

Other systems, setups, and parameters may be used in other implementations, which may provide the same or different results. Many variations are possible and are contemplated within the scope of this disclosure. Films, layers, components, features, structures, and/or elements may be added, removed, or rearranged. Additionally, process or method steps may be added, removed, or reordered.

For purposes of this disclosure, certain aspects, advantages, and novel features are described herein. It is to be understood that not necessarily all such advantages may be achieved in accordance with any particular embodiment. Thus, for example, those skilled in the art will recognize that the systems and methods may be embodied or carried out in a manner that achieves one advantage or group of advantages as taught herein without necessarily achieving other advantages as may be taught or suggested herein. Furthermore, embodiments may include several novel features, no single one of which is solely responsible for the embodiment's desirable attributes or which is essential to practicing the systems and methods described herein. Additionally, in any method or process disclosed herein, the acts or operations of the method or process may be performed in any suitable sequence and are not necessarily limited to any particular disclosed sequence.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Accordingly, although certain preferred embodiments and examples have been described herein, it will be understood by those skilled in the art that the present application extends beyond the specifically disclosed embodiments to other alternative embodiments and/or uses and obvious modifications and equivalents thereof. In addition, while several variations have been shown and described in detail, other modifications, which are within the scope of this application will be readily apparent to those of skill in the art. It is also contemplated that various combinations or sub-combinations of the specific features and aspects of the embodiments may be made and still fall within the scope of the application. It should be understood that various features and aspects of the disclosed embodiments can be combined with, or substituted for, one another in order to form various alternative embodiments. Thus, it is intended that the scope of the application should not be limited by the particular disclosed embodiments described above.

What is claimed is:

1. A multi-clad fiber amplifier system, comprising:
   an optical fiber having a core and a pump cladding, said pump cladding comprising a continuous pump cladding inner boundary, wherein said pump cladding inner boundary comprises a corrugated inner boundary comprising a plurality of linear or curved segments along said inner cladding boundary that form at least twelve crests that alternate with at least twelve troughs, wherein said pump cladding is all glass; and
   a pump source configured to pump the optical fiber,
   wherein said pump cladding is configured to mix pump modes and scatter or reflect pump energy from the pump source into the core of the optical fiber.

2. The multi-clad fiber amplifier system of claim 1, wherein said optical fiber comprises a leakage channel fiber (LCF).

3. The multi-clad fiber amplifier system of claim 1, wherein said optical fiber is drawn from a preform comprising an inner region having one or more layers of rods formed from a background material and one or more layers of pump cladding rods that substantially surround the inner region.

4. The multi-clad fiber amplifier system of claim 1, wherein one or more of the at least twelve crests are concave.

5. The multi-clad fiber amplifier system of claim 1, wherein one or more of the at least twelve troughs are convex.

6. The multi-clad fiber amplifier system of claim 1, wherein a fractional radial extent of at least one of the crests or a radial extent of at least one of the troughs is in a range from about 5% to about 25%.

7. The multi-clad fiber amplifier system of claim 1, further comprising an end cap fiber attached to an end of said optical fiber, the end cap fiber having a pump guide substantially matched to said pump cladding of said optical fiber, the end cap fiber not having a guiding core, wherein the pump guide of the end cap fiber is configured to receive pump light from said pump source.

8. The multi-clad fiber amplifier system of claim 1, wherein the pump cladding substantially surrounds a first cladding having first cladding features, the first cladding substantially surrounding the core.

9. The multi-clad fiber amplifier system of claim 8, wherein the first cladding comprises glass with a refractive index lower than a refractive index of the core.

10. The multi-clad fiber amplifier system of claim 8, wherein at least one of the first cladding features comprises a stress rod.

11. The multi-clad fiber amplifier system of claim 10, wherein the stress rod comprises boron-doped silica.

12. The multi-clad fiber amplifier system of claim 8, wherein the pump cladding substantially surrounds a second cladding, which substantially surrounds the first cladding.

13. The multi-clad fiber amplifier system of claim 1, wherein the pump cladding comprises fused silica doped with fluorine.

14. The multi-clad fiber amplifier system of claim 13, wherein a numerical aperture of the pump cladding is greater than about 0.15.

15. The multi-clad fiber amplifier system of claim 1, wherein some or all of the core is doped with a rare earth dopant.

16. The multi-clad fiber amplifier system of claim 1, further comprising an input fiber coupled to the optical fiber to provide a signal to the fiber amplifier system.

17. The multi-clad fiber amplifier system of claim 16, wherein the input fiber is coupled to the optical fiber via a tapered section.

18. The multi-clad fiber amplifier system of claim 17, wherein the signal comprises a propagating mode, and the tapered section is configured to change the mode size along the tapered section so that the mode is matched to the input fiber at a first end of the tapered section and matched to the optical fiber at a second end of the tapered section.

19. The multi-clad fiber amplifier system of claim 17, wherein the tapered section is spliced to the input fiber.

20. The multi-clad fiber amplifier system of claim 16, wherein a core of the input fiber has a cross-sectional size that varies along a portion of the input fiber.

21. The multi-clad fiber amplifier system of claim 1, wherein a portion of the optical fiber is coiled.

22. The multi-clad fiber amplifier system of claim 1, wherein the optical fiber comprises an all glass fiber.

* * * * *